US011795261B2

(12) United States Patent
Suesugi et al.

(10) Patent No.: US 11,795,261 B2
(45) Date of Patent: Oct. 24, 2023

(54) POLYMERIZABLE COMPOSITION FOR OPTICAL MATERIAL, POLYMERIZABLE PREPOLYMER COMPOSITION FOR OPTICAL MATERIAL, CURED PRODUCT, AND METHOD OF PRODUCING OPTICAL MATERIAL

(71) Applicant: MITSUI CHEMICALS, INC., Tokyo (JP)

(72) Inventors: Kouji Suesugi, Arao (JP); Shinsuke Ito, Omuta (JP); Shotaro Nakano, Omuta (JP); Yusuke Matsui, Omuta (JP)

(73) Assignee: MITSUI CHEMICALS, INC., Tokyo (JP)

(*) Notice: Subject to any disclaimer, the term of this patent is extended or adjusted under 35 U.S.C. 154(b) by 0 days.

(21) Appl. No.: 17/963,406

(22) Filed: Oct. 11, 2022

(65) Prior Publication Data

US 2023/0048290 A1 Feb. 16, 2023

Related U.S. Application Data

(62) Division of application No. 17/431,250, filed as application No. PCT/JP2021/002899 on Jan. 27, 2021, now Pat. No. 11,499,000.

(30) Foreign Application Priority Data

Jan. 27, 2020 (JP) ................................ 2020-011128
Nov. 24, 2020 (JP) ................................ 2020-194660

(51) Int. Cl.

*C08G 18/10* (2006.01)
*C08G 18/18* (2006.01)
*C08G 18/24* (2006.01)
*C08G 18/76* (2006.01)
*G02B 1/04* (2006.01)

(52) U.S. Cl.

CPC ............. *C08G 18/10* (2013.01); *C08G 18/18* (2013.01); *C08G 18/24* (2013.01); *C08G 18/76* (2013.01); *G02B 1/04* (2013.01)

(58) Field of Classification Search

CPC ......... G02B 1/041; C08L 75/04; C08L 81/00; C08L 101/02

See application file for complete search history.

(56) References Cited

U.S. PATENT DOCUMENTS 7,762,662 B1* 7/2010 Eno ........................ G02C 7/046 351/159.24
2009/0227745 A1 9/2009 Kohgo et al.
2013/0079485 A1* 3/2013 Cai .................... C08G 18/7621 528/68
2015/0126781 A1 5/2015 Kawaguchi et al.
2015/0133692 A1 5/2015 Kawaguchi et al.
2015/0315327 A1* 11/2015 Kawato .............. C08G 18/3885 359/492.01
2015/0331147 A1 11/2015 Ryu et al.
2015/0370094 A1 12/2015 Hashimoto et al.
2016/0017085 A1 1/2016 Kawaguchi et al.
2016/0017218 A1 1/2016 Kojima et al.
2016/0024242 A1 1/2016 Kawaguchi et al.
2016/0272784 A1* 9/2016 Ito ...................... C08G 18/7621
2016/0297939 A1* 10/2016 Arita ........................ G02B 1/14
2016/0304701 A1 10/2016 Kakinuma et al.
2016/0313575 A1 10/2016 Kakinuma et al.
2017/0057184 A1 3/2017 Kakinuma
2018/0022860 A1* 1/2018 Ito ........................... G02B 1/04 528/18
2018/0030341 A1 2/2018 Shimizu et al.
2019/0127508 A1 5/2019 Ryu
2019/0248949 A1 8/2019 Ito et al.
2020/0002586 A1* 1/2020 Liu ....................... C08F 261/12
2020/0017720 A1* 1/2020 Liu ......................... B32B 17/10
2020/0148856 A1 5/2020 Kasori et al.
2022/0041788 A1* 2/2022 Suesugi ............. C08G 18/8054
2022/0041789 A1 2/2022 Suesugi et al.
2023/0048290 A1* 2/2023 Suesugi ............. C08G 18/7642

FOREIGN PATENT DOCUMENTS

| | | | |
|---|---|---|---|
| CN | 101228203 | A | 7/2008 |
| CN | 102112548 | A | 6/2011 |
| CN | 105992781 | A | 10/2016 |
| CN | 109715693 | A | 5/2019 |
| CN | 109906240 | A | 6/2019 |
| JP | 2004530780 | A | 10/2004 |
| JP | 2006265408 | A | 10/2006 |
| JP | 6095646 | B2 | 3/2017 |
| WO | 03002632 | A1 | 1/2003 |
| WO | 2014027427 | A1 | 2/2014 |
| WO | 2014077369 | A1 | 5/2014 |
| WO | 2014080750 | A1 | 5/2014 |
| WO | 2014133111 | A1 | 9/2014 |
| WO | 2016125786 | A1 | 8/2016 |
| WO | 2016143910 | A1 | 9/2016 |
| WO | 2019009230 | A1 | 1/2019 |

OTHER PUBLICATIONS

Written Opinion (PCT/ISA/237) dated Apr. 6, 2021, by the Japanese Patent Office as the International Searching Authority for International Application No. PCT/JP2021/002899, and an English translation of the Written Opinion.

(Continued)

*Primary Examiner* — Peter A Salamon

(74) *Attorney, Agent, or Firm* — BUCHANAN INGERSOLL & ROONEY PC

(57) ABSTRACT

A polymerizable composition for an optical material containing two or more different monomers for an optical material, and a polymerization catalyst, in which at least one of the two or more different monomers for an optical material is an isocyanate compound containing an aromatic ring, a content of the polymerization catalyst with respect to a total of 100 parts by mass of the two or more different monomers for an optical material is from 0.010 parts by mass to 0.50 parts by mass, and the viscosity measured by a B-type viscometer at 25° C. and 60 rpm is from 10 mPa·s to 1,000 mPa·s.

7 Claims, No Drawings

(56) References Cited

OTHER PUBLICATIONS

Written Opinion (PCT/ISA/237) dated Apr. 6, 2021, by the Japanese Patent Office as the International Searching Authority for International Application No. PCT/JP2021/002900, with an English translation of the Written Opinion. (9 pages).

* cited by examiner

POLYMERIZABLE COMPOSITION FOR OPTICAL MATERIAL, POLYMERIZABLE PREPOLYMER COMPOSITION FOR OPTICAL MATERIAL, CURED PRODUCT, AND METHOD OF PRODUCING OPTICAL MATERIAL

CROSS REFERENCE OF RELATED APPLICATIONS

This application is a division of U.S. patent application Ser. No. 17/431,250, filed on Aug. 16, 2021, entitled "POLYMERIZABLE COMPOSITION FOR OPTICAL MATERIAL, POLYMERIZABLE PREPOLYMER COMPOSITION FOR OPTICAL MATERIAL, CURED PRODUCT, AND METHOD OF PRODUCING OPTICAL MATERIAL," which in turn is a national stage application of PCT/JP2021/002899, filed on Jan. 27, 2021, which in turn claims priority to Japanese Patent Application No. 2020-011128, filed on Jan. 27, 2020, and Japanese Patent Application No. 2020-194660, filed on Nov. 24, 2020. The entire content of each of the prior applications is hereby incorporated by reference.

TECHNICAL FIELD

The present disclosure relates to a polymerizable composition for an optical material, a polymerizable prepolymer composition for an optical material, a cured product, and a method of producing an optical material.

BACKGROUND ART

Examples of methods of producing resins used for an optical material for plastic lenses include a casting polymerization method in which a polymerizable composition containing a monomer is cast into a mold and heat cured.

In a casting polymerization method, after formulating a polymerizable composition and degassing, the polymerizable composition is cast into a mold, undergoes heat curing (polymerization reaction), a product is removed from the mold (mold release), and annealing is performed to obtain an optical material (such as a lens or a semi-finished blank).

In heat curing, in order to improve the quality of an optical material, it is common to carry out a polymerization reaction over several hours to several tens of hours while gradually increasing the temperature by heating, and specifically, it generally takes 20 to 48 hours. It is known that much of the total time of production process (for example, 90% of the total time) is spent for polymerization.

In Examples of Patent Document 1, it is described that a mold cast with a polymerizable composition was gradually heated up from 10° C. to 120° C. and polymerized in 20 hours to obtain a molded body.

In Examples in Patent Document 2, it is described that a mold cast with a polymerizable composition was gradually heated from 25° C. to 120° C. over 16 hours, and then heated at 120° C. for 4 hours to obtain a molded body.

Patent Document 1: WO2014/027427

Patent Document 2: WO2014/133111

SUMMARY OF INVENTION

Technical Problem

As described above, conventionally, it is common in processes for producing an optical material that polymerization reactions are carried out over several hours to several tens of hours (for example, 20 to 48 hours) while increasing the temperature gradually by heating.

However, long production time of an optical material requires long operation of equipment related to the production, which has been an economic burden and impaired work efficiency.

On the other hand, when performing polymerization reaction with shortened heat polymerization time in producing an optical material by a method as conventionally used, it is considered that the quality of the optical material will be degraded due to a defect such as the optical material not being cured due to insufficient polymerization, or generation of striae in the optical material even when cured.

As described above, in production of an optical material, there is a need to maintain the quality of an optical material to be obtained and to shorten the production time of an optical material.

A problem to be solved by an embodiment of the disclosure is to provide a method of producing an optical material in which the quality of the optical material to be obtained can be maintained and the production time of the optical material can be shortened.

A problem to be solved by an embodiment of the disclosure is to provide a polymerizable composition for an optical material used in a method of producing an optical material in which the quality of the optical material to be obtained can be maintained and the production time of the optical material can be shortened.

Solution to Problem

Specific means to solve the above-described problems include the following aspects.

A first embodiment of the disclosure includes the following aspects.

<1> A polymerizable composition for an optical material containing two or more different monomers for an optical material, and a polymerization catalyst, wherein at least one of the two or more different monomers for an optical material is an isocyanate compound containing an aromatic ring, a content of the polymerization catalyst with respect to a total of 100 parts by mass of the two or more different monomers for an optical material is from 0.010 parts by mass to 0.50 parts by mass, and a viscosity measured by a B-type viscometer at 25° C. and 60 rpm is from 10 mPa·s to 1,000 mPa·s.

<2> The polymerizable composition for an optical material according to <1>, wherein a thixotropy ratio is 1.3 or less.

<3> The polymerizable composition for an optical material according to <1> or <2>, containing two or more different monomers for an optical material, a polymerization catalyst, and a prepolymer that is a polymer of the two or more different monomers for an optical material and that contains a polymerizable functional group.

<4> The polymerizable composition for an optical material according to any one of <1> to <3>, wherein the two or more different monomers for an optical material contain at least one active hydrogen compound selected from the group consisting of a polythiol compound containing two or more mercapto groups, a hydroxythiol compound containing one or more mercapto groups and one or more hydroxyl groups, a polyol compound containing two or more hydroxyl groups, and an amine compound.

<5> The polymerizable composition for an optical material according to any one of <1> to <4>, wherein the polymerization catalyst satisfies the following Condition 1.

[Condition 1]

$-Ea/R$ is from −7,100 to −2,900.

(wherein Ea is an activation energy calculated by an Arrhenius plot from reaction rate constants of the two or more different monomers for an optical material at two or more different temperatures, and R is the gas constant 8.314 J/mol/K.)

<6> The polymerizable composition for an optical material according to any one of <1> to <5>, wherein the polymerization catalyst contains at least one selected from the group consisting of a basic catalyst having a pKa value of from 4 to 8 and an organometallic catalyst.

<6-1> The polymerizable composition for an optical material according to any one of <1> to <6>, wherein the polymerization catalyst contains at least one selected from the group consisting of an amine catalyst and an organotin catalyst.

<6-2> The polymerizable composition for an optical material according to any one of <1> to <6-1>, wherein the polymerization catalyst contains at least one selected from the group consisting of 3,5-lutidine, 2,4,6-collidine, triethylenediamine, N,N-dimethylethanolamine, N-ethylmorpholine, dibutyltin dichloride, dimethyltin dichloride, dibutyltin dilaurate, and dibutyltin diacetate.

<7> A polymerizable prepolymer composition for an optical material containing a polymerization catalyst and a prepolymer that is a polymer of two or more different monomers for an optical material and that contains a polymerizable functional group, wherein at least one of the two or more different monomers for an optical material is an isocyanate compound containing an aromatic ring, and a viscosity measured with a B-type viscometer at 25° C. and 60 rpm is from 10 mPa·s to 2,000 mPa·s.

<8> The polymerizable prepolymer composition for an optical material according to <7>, wherein a content of the polymerization catalyst with respect to a total of 100 parts by mass of the prepolymer is from 0.002 parts by mass to 0.50 parts by mass.

<8-1> The polymerizable prepolymer composition for an optical material according to <7> or <8>, wherein a thixotropy ratio is 1.3 or less.

<8-2> The polymerizable prepolymer composition for an optical material according to any one of <7> to <8-1>, wherein the prepolymer contains an isocyanate group.

<8-3> The polymerizable prepolymer composition for an optical material according to any one of <7> to <8-1>, wherein the prepolymer contains substantially no isocyanate groups.

<9> The polymerizable prepolymer composition for an optical material according to any one of <7> to <8-3>, wherein the two or more different monomers for an optical material include at least one active hydrogen compound selected from the group consisting of a polythiol compound containing two or more mercapto groups, a hydroxythiol compound containing one or more mercapto groups and one or more hydroxyl groups, a polyol compound containing two or more hydroxyl groups, and an amine compound.

<10> The polymerizable prepolymer composition for an optical material according to any one of <7> to <9>, wherein the polymerization catalyst satisfies the following Condition 1:

[Condition 1]

$-Ea/R$ is from −7,100 to −2,900

(wherein Ea is an activation energy calculated by an Arrhenius plot from reaction rate constants of the two or more different monomers for an optical material at two or more different temperatures, and R is the gas constant 8.314 J/mol/K.)

<11> The polymerizable prepolymer composition for an optical material according to any one of <7> to <10>, wherein the polymerization catalyst contains at least one selected from the group consisting of a basic catalyst having a pKa value of from 4 to 8 and an organometallic catalyst.

<11-1> The polymerizable prepolymer composition for an optical material according to any one of <7> to <11>, wherein the polymerization catalyst contains at least one selected from the group consisting of an amine catalyst and an organotin catalyst.

<11-2> The polymerizable prepolymer composition for an optical material according to any one of <7> to <11-1>, wherein the value obtained by subtracting the refractive index B of a prepolymer raw material composition, which is a composition before forming the prepolymer and which is a composition containing two or more different monomers for an optical material and a polymerization catalyst, from the refractive index A of the prepolymer composition for an optical material is greater than 0.

<12> A cured product of the polymerizable composition for an optical material according to any one of <1> to <6-2> or the polymerizable prepolymer composition for an optical material according to any one of <7> to <11-2>.

<12-1> The cured product of the polymerizable composition for an optical material according to <12>, wherein, in the polymerizable composition for an optical material, the two or more different monomers for an optical material include at least one active hydrogen compound selected from the group consisting of a polythiol compound containing two or more mercapto groups, a hydroxythiol compound containing one or more mercapto groups and one or more hydroxyl groups, a polyol compound containing two or more hydroxyl groups, and an amine compound.

<12-2> The cured product of the polymerizable composition for an optical material according to <12> or <12-1>, wherein, in the polymerizable composition for an optical material, the polymerization catalyst satisfies the following Condition 1.

[Condition 1]

$-Ea/R$ is from −7,100 to −2,900

(wherein Ea is an activation energy calculated by an Arrhenius plot from reaction rate constants of the two or more different monomers for an optical material at two or more different temperatures, and R is the gas constant 8.314 J/mol/K.)

<12-3> The cured product of the polymerizable composition for an optical material according to any one of <12> to <12-2>, wherein, in the polymerizable composition for an optical material, the polymerization catalyst contains at least one selected from the group consisting of a basic catalyst having a pKa value of from 4 to 8 and an organometallic catalyst.

<12-4> The cured product of the polymerizable composition for an optical material according to any one of <12> to <12-3>, wherein, in the polymerizable composition for an optical material, the polymerization catalyst contains at least one selected from the group consisting of an amine catalyst and an organotin catalyst.

<12-5> The cured product of the polymerizable composition for an optical material according to any one of <12> to <12-4>, wherein, in the polymerizable composition for an optical material, the polymerization catalyst contains at least one selected from the group consisting of 3,5-lutidine, 2,4,6-collidine, triethylenediamine, N,N-dimethylethanolamine, N-ethylmorpholine, dibutyltin dichloride, dimethyltin dichloride, dibutyltin dilaurate, and dibutyltin diacetate.

<13> A method of producing an optical material, the method including: a preparation process of preparing a polymerizable composition for an optical material containing two or more different monomers for an optical material, and a polymerization catalyst, wherein at least one of the two or more different monomers for an optical material is an isocyanate compound containing an aromatic ring, and a content of the polymerization catalyst with respect to a total of 100 parts by mass of the two or more different monomers for an optical material is from 0.010 parts by mass to 0.50 parts by mass; and a curing process of curing the polymerizable composition for an optical material by polymerizing the two or more different monomers for an optical material in the polymerizable composition for an optical material.

<14> A method of producing an optical material, the method including: a preparation process of preparing a total of 100 parts by mass of two or more different monomers for an optical material and from 0.010 parts by mass to 0.50 parts by mass of a polymerization catalyst; and a prepolymerization process of obtaining, by obtaining a prepolymer by mixing a portion of the two or more different monomers for an optical material and at least a portion of the polymerization catalyst and polymerizing at least a portion in the portion of the two or more different monomers for an optical material, a mixture containing the prepolymer, wherein at least one of the two or more different monomers for an optical material is an isocyanate compound containing an aromatic ring.

<15> The method of producing an optical material according to <14>, the method including: a process of producing a polymerizable composition for an optical material in which, by further adding at least a balance of the two or more different monomers for an optical material to the mixture containing the prepolymer, a polymerizable composition for an optical material containing the two or more different monomers for an optical material, the prepolymer, and the polymerization catalyst is obtained; and a curing process in which, by curing the two or more different monomers for an optical material in the polymerizable composition for an optical material, an optical material that is a cured product of the polymerizable composition for an optical material is obtained.

<16> The method of producing an optical material according to any one of <13> to <15>, wherein the two or more different monomers for an optical material include at least one active hydrogen compound selected from the group consisting of a polythiol compound containing two or more mercapto groups, a hydroxythiol compound containing one or more mercapto groups and one or more hydroxyl groups, a polyol compound containing two or more hydroxyl groups, and an amine compound.

<17> The method of producing an optical material according to any one of <13> to <16>, wherein the polymerization catalyst satisfies the following Condition 1.

[Condition 1]

$-Ea/R$ is from −7,100 to −2,900

(wherein Ea is an activation energy calculated by an Arrhenius plot from reaction rate constants of the two or more different monomers for an optical material at two or more different temperatures, and R is the gas constant 8.314 J/mol/K.)

<18> The method of producing an optical material according to any one of <13> to <17>, wherein the polymerization catalyst contains at least one selected from the group consisting of a basic catalyst having a pKa value of from 4 to 8 and an organometallic catalyst.

<19> The method of producing an optical material according to any one of <13> to <18>, wherein the polymerization catalyst contains at least one selected from the group consisting of an amine catalyst and an organotin catalyst.

<20> A cured product of two or more different optical monomers, wherein at least one of the two or more different monomers for an optical material is an isocyanate compound containing an aromatic ring, there are no striae of a length of 1.0 mm or more within a radius of 15 mm from a center of the cured product, and an amine content, as measured by gas chromatography mass spectrometry, is from 0.001% by mass to 0.50% by mass.

Advantageous Effects of Invention

According to one embodiment of the disclosure, a method of producing an optical material in which the quality of the optical material to be obtained can be maintained and the production time of the optical material can be shortened can be provided.

According to one embodiment of the disclosure, a polymerizable composition for an optical material used in a method of producing an optical material in which the quality of the optical material to be obtained can be maintained and the production time of the optical material can be shortened can be provided.

According to one embodiment of the disclosure, a method of producing an optical material in which striae in the optical material to be obtained can be suppressed and the production time of the optical material can be shortened can be provided.

According to one embodiment of the disclosure, a polymerizable composition for an optical material used in a method of producing an optical material in which striae in the optical material to be obtained can be suppressed and the production time of the optical material can be shortened can be provided.

DESCRIPTION OF EMBODIMENTS

Herein, each numerical range specified using "(from) . . . to . . . " represents a range including the numerical values noted before and after "to" as the minimum value and the maximum value, respectively.

Herein, the amount of each component in a composition means the total amount of the plurality of substances present in the composition, unless otherwise specified, when there is more than one substance corresponding to each component in the composition.

With regard to the stepwise numerical ranges described herein, the upper limit value or the lower limit value described in one numerical range may be replaced with the upper limit value or the lower limit value of another stepwise numerical range. In the numerical ranges described herein, upper limit values or lower limit values of the numerical value ranges may be replaced with values described in Examples.

Herein, the term "process" includes not only independent processes, but also processes that are not clearly distinguishable from other processes, as long as a desired purpose of the process is achieved.

The disclosure includes a first embodiment and a second embodiment.

Each embodiment will be described.

First Embodiment

«Polymerizable Composition for an Optical Material»

The polymerizable composition for an optical material of the first embodiment is a polymerizable composition for an optical material containing two or more different monomers for an optical material, and a polymerization catalyst, wherein at least one of the two or more different monomers for an optical material is an isocyanate compound containing an aromatic ring, the content of the polymerization catalyst with respect to the total of 100 parts by mass of the two or more different monomers for an optical material is from 0.010 parts by mass to 0.50 parts by mass, and the viscosity measured by a B-type viscometer at 25° C. and 60 rpm is from 10 mPa·s to 1,000 mPa·s.

When the polymerizable composition for an optical material of the first embodiment includes the above-described configuration, the quality of an optical material to be obtained can be maintained, and the production time of an optical material can be favorably reduced.

(Monomer for An optical material)

The polymerizable composition for an optical material of the first embodiment contains two or more different optical material monomers, wherein at least one of the optical material monomers is an isocyanate compound containing an aromatic ring.

The monomer for an optical material may be any monomer that is used for optical applications, and is not particularly restricted.

For example, monomers used to produce an optical material that have any of the following properties may be used.

An optical material obtained by using monomers for an optical material may have a total light transmittance of 10% or higher. The total light transmittance of the above-described an optical material may be measured in accordance with JIS K 7361-1 (1997).

An optical material obtained using a monomer for an optical material may have a haze (or total haze) of 10% or less, preferably 1% or less, and still more preferably 0.5% or less. The haze of the optical material is a value measured at 25° C. using a haze meter [TC-HIII DPK manufactured by Tokyo Denshoku Co., Ltd.] in accordance with JIS-K7105.

An optical material obtained by using monomers for an optical material preferably have a refractive index of 1.58 or higher. An optical material obtained by using a monomer for an optical material may have a refractive index of 1.80 or less, or 1.75 or less. The refractive index of the optical material may be measured in accordance with JIS K7142 (2014).

The shape of an optical material obtained by using a monomer for an optical material is not particularly limited, and may be plate, cylinder, rectangular, or the like.

Examples of a monomer for an optical material include a polymerizable monomer that polymerizes when the polymerization catalyst described below is used. Specific examples of the polymerizable monomer include an isocyanate compound, a polythiol compound containing two or more mercapto groups, a hydroxythiol compound containing one or more mercapto groups and one or more hydroxyl groups, a polyol compound containing two or more hydroxyl groups, and an amine compound.

The two or more different monomers for an optical material preferably contain at least one active hydrogen compound selected from the group consisting of a polythiol compound containing two or more mercapto groups, a hydroxythiol compound containing one or more mercapto groups and one or more hydroxyl groups, a polyol compound containing two or more hydroxyl groups, and an amine compound.

[Isocyanate Compound]

Examples of the isocyanate compound include an aliphatic isocyanate compound, an alicyclic isocyanate compound, an aromatic isocyanate compound, and a heterocyclic isocyanate compound, and one or more of these compounds are used in a mixture. These isocyanate compounds may include a dimer, a trimer, or a prepolymer. Examples of these isocyanate compounds include compounds as illustrated in International Publication No. 2011/055540.

Furthermore, as the isocyanate compound, a halogen-substituted (for example, chlorine-substituted, or bromine-substituted), alkyl-substituted, alkoxy-substituted, carbodiimide-modified, urea-modified, or burette-modified compound of the above-described compound;

a prepolymer-type modified compound of the above-described compound and a nitro-substituted compound, a polyhydric alcohol, or the like; or a dimerization or trimerization reaction product of the above-described compound can also be used.

These compounds may be used singly or in a mixture of two or more kinds thereof

Herein, an alicyclic isocyanate compound refers to an isocyanate compound that may contain an alicyclic structure and may contain a structure other than an alicyclic structure, such as a heterocyclic structure.

An aromatic isocyanate compound refers to an isocyanate compound that contains an aromatic structure and may contain any one or a combination of an aliphatic structure, an alicyclic structure, and a heterocyclic structure.

A heterocyclic isocyanate compound refers to an isocyanate compound that contains a heterocyclic structure and does not contain an alicyclic structure and an aromatic structure.

An aliphatic isocyanate compound refers to an isocyanate compound that does not contain an aromatic structure, an alicyclic structure, and a heterocyclic structure.

The isocyanate compound preferably contains at least one selected from the group consisting of an aliphatic isocyanate compound, an alicyclic isocyanate compound, an aromatic isocyanate compound, and a heterocyclic isocyanate compound.

At least one of the monomers for an optical material in the first embodiment is an isocyanate compound containing an aromatic ring. Specific examples of the isocyanate compound containing an aromatic ring include an aromatic isocyanate compound, and more specific examples thereof include an isocyanate compound in which an isocyanate group is bonded directly to an aromatic ring, and an isocyanate compound in which an isocyanate group is bonded to a benzyl position of an aromatic ring.

An isocyanate compound containing an aromatic ring is preferred over an isocyanate compound containing no aromatic rings (for example, an alicyclic isocyanate compound, or an aliphatic isocyanate compound) in that the activity of an isocyanate group is higher, which facilitates a polymerization reaction.

A monomer for an optical material may contain an isocyanate compound other than an isocyanate compound containing an aromatic ring, that is an isocyanate compound containing no aromatic rings.

When the monomer for an optical material contains an isocyanate compound containing no aromatic rings and an isocyanate compound containing an aromatic ring, from the viewpoint of controlling a polymerization reaction, the ratio of isocyanate compounds containing no aromatic rings to isocyanate compounds containing an aromatic ring in terms of the molar ratio of isocyanate groups is preferably within the range of from 3:7 to 0:10, and more preferably within the range of from 2:8 to 0:10.

The isocyanate compound other than isocyanate compounds containing an aromatic ring is not particularly restricted, and examples thereof include an isocyanate compound containing no aromatic rings. When the monomer for an optical material contains an isocyanate compound containing no aromatic rings and an isocyanate compound containing an aromatic ring, the number of moles of isocyanate groups in the isocyanate compound containing no aromatic rings is preferably less than the number of moles of isocyanate groups in the isocyanate compound containing an aromatic ring.

In the first embodiment, from the viewpoint of maintaining the quality of an optical material and reducing the production time of the optical material, the isocyanate compound preferably contains at least one selected from the group consisting of isophorone diisocyanate, 2,5 -bis(isocyanatomethyl)bicyclo-[2.2.1]-heptane, 2,6-bis(isocyanatomethyl)bicyclo-[2.2.1]-heptane, m-xylene diisocyanate, 2,4-tolylene diisocyanate, 2, 6-tolylene diisocyanate, dicyclohexylmethane diisocyanate, 1,3-bis(isocyanatomethyl) cyclohexane, 1,4-bis(isocyanatomethyl)cyclohexane, 1,6-hexamethylene diisocyanate, and 1,5-pentamethylene diisocyanate, more preferably contains at least one selected from the group consisting of isophorone diisocyanate, 2,5-bis (isocyanatomethyl)bicyclo-[2.2.1]-heptane, 2,6-bis (isocyanatomethyl)bicyclo-[2.2.1]-heptane, m-xylene diisocyanate, 2,4-tolylene diisocyanate, 2,6-tolylene diisocyanate, dicyclohexylmethane diisocyanate, and 1,3-bis(isocyanatomethyl)cyclohexane, still more preferably contains at least one selected from the group consisting of m-xylene diisocyanate, 2,4-tolylene diisocyanate, 2,6-tolylene diisocyanate, dicyclohexylmethane diisocyanate, and 1,3-bis(isocyanatomethyl)cyclohexane, and particularly preferably contains m-xylene diisocyanate.

[Active Hydrogen Compound]

Examples of the active hydrogen compound include a polythiol compound containing two or more mercapto groups, a hydroxythiol compound containing one or more mercapto groups and one or more hydroxyl groups, a polyol compound containing two or more hydroxyl groups, and an amine compound.

As the active hydrogen compound, an oligomer of the active hydrogen compound or a halogen-substituted compound of the active hydrogen compound (for example, a chlorine-substituted compound, or a bromine-substituted compound) may be used.

The active hydrogen compounds may be used singly or in a mixture of two or more kinds thereof.

(Polythiol Compound Containing Two or More Mercapto Groups)

Examples of the polythiol compound containing two or more mercapto groups include compounds as illustrated in WO2016/125736.

In the first embodiment, from the viewpoint of maintaining the quality of the optical material and reducing the manufacturing time of the optical material, the polythiol compound preferably contains at least one species selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4, 8-dimercaptomethyl-1,11-dimercapto-3,6,9-trithiaundecane, pentaerythritol tetrakis(3 -mercaptopropionate), bis(mercaptoethyl)sulfide, pentaerythritol tetrakis(2-mercaptoacetate), 2,5-bis(mercaptomethyl)-1,4-dithiane, 1,1,3,3 -tetrakis(mercaptomethylthio)propane, 4,6-bis(mercaptomethylthio)-1,3-dithiane, and 2-(2,2-bis(mercaptomethylthio)ethyl)-1,3-dithiethane, more preferably contains at least one selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4, 8-dimercaptomethyl-1,11-dimercapto-3,6,9-trithiaundecane, pentaerythritol tetrakis(3 -mercaptopropionate), pentaerythritol tetrakis(2-mercaptoacetate), and 2,5-bis(mercaptomethyl)-1,4-dithiane, and still more preferably contains at least one selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4, 8-dimercaptomethyl-1,11-dimercapto-3,6,9-trithiaundecane, and pentaerythritol tetrakis(3 -mercaptopropionate).

(Polythiol Compound Containing Three or More Mercapto Groups)

Examples of the active hydrogen compound also include a polythiol compound containing three or more mercapto groups.

When the polymerizable composition for an optical material of the first embodiment includes a polythiol compound containing three or more mercapto groups as an active hydrogen compound, from the viewpoint of promoting a polymerization reaction, it is preferable to contain a compound (also referred to as compound (N1)) in which at least one mercapto group among the three or more mercapto groups contained in the polythiol compound containing three or more mercapto groups is replaced by a group represented by the following Formula (N1).

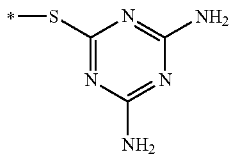

(N1)

In Formula (N1), * represents a bonding position.

In the polymerizable composition for an optical material of the first embodiment, from the viewpoint of readily adjusting a polymerization reaction, when the peak area is measured by high performance liquid chromatography, the peak area of the compound (N1) with respect to the peak area 100 of the polythiol compound containing three or more mercapto groups is preferably 3.0 or less, and more preferably 1.5 or less.

When the peak area is measured by high performance liquid chromatography, from the viewpoint of promoting a polymerization reaction, the peak area of the compound (N1) with respect to the peak area 100 of the polythiol compound containing three or more mercapto groups is preferably 0.01 or more.

The peak area by high performance liquid chromatography can be measured by the method described in paragraph 0146 and the like of WO2014/027665.

(Hydroxythiol Compound Containing One or More Mercapto Groups and One or More Hydroxyl Groups)

Examples of the thiol compound containing a hydroxy group include 2-mercaptoethanol, 3 -mercapto-1,2-propanediol, glycerin bis(mercaptoacetate), 4-mercaptophenol, 2,3-dimercapto-l-propanol, pentaerythritol tris(3-mercaptopropionate), pentaerythritol tris(thioglycolate), but are not limited to only these illustrated compounds.

(Polyol Compound Containing Two or More Hydroxyl Groups)

Examples of the polyol compound include one or more aliphatic or alicyclic alcohols. Examples thereof include a linear or branched aliphatic alcohol, an alicyclic alcohol, and an alcohol to which at least one alcohol selected from the group consisting of ethylene oxide, propylene oxide, and ε-caprolactone has been added. More specific examples thereof include the compounds as illustrated in WO2016/125736.

The above-described polyol compound is preferably at least one selected from the group consisting of ethylene glycol, diethylene glycol, triethylene glycol, propylene glycol, 1,3-propanediol, 1,2-cyclopentane diol, 1,3-cyclopentanediol, 1,2-cyclohexanediol, 1,3-cyclohexanediol, and 1,4-cyclohexanediol.

(Amine Compound)

Examples of the amine compound include a primary polyamine compound such as ethylenediamine, 1,2- or 1,3-diaminopropane, 1,2-, 1,3-, or 1,4-diaminobutane, 1,5-diaminopentane, 1,6-diaminohexane, 1,7-diaminoheptane, 1, 8-diamino-octane, 1,10-diamino-decane, 1,2-, 1,3-, or 1,4-diaminocyclohexane, o-, m-, or p-diaminobenzene, 3,4- or 4,4'-diaminobenzophenone, 3,4- or 4,4'-diaminodiphenyl ether, 4,4'-diaminodiphenylmethane, 4,4'-diaminodiphenyl sulfide, 3,3' or 4,4'-diaminodiphenyl sulfone, 2,7-diaminofluorene, 1,5-, 1,8-, or 2,3-diaminonaphthalene, 2,3-, 2,6-, or 3,4-diaminopyridine, 2,4- or 2,6-diaminotoluene, m- or p-xylenediamine, isophoronediamine, diaminomethylbicycloheptane, 1,3- or 1,4-diaminomethylcyclohexane, 2- or 4-aminopiperidine, 2- or 4-aminomethylpiperidine, 2- or 4-aminoethylpiperidine, N-aminoethylmorpholine, or N-aminoethylmorpholine;

a monofunctional secondary amine compound such as diethylamine, dipropylamine, di-n-butylamine, di-sec-butylamine, di-isobutylamine, di-n-pentylamine, di-3-pentylamine, dihexylamine, dioctylamine, di(2-ethylhexyl) amine, methylhexylamine, diallylamine, N-methylallylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine, or morpholine; and a secondary polyamine compound such as N,N'-dimethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1, 6-diaminohexane, N,N'-dimethyl-1,7-diaminoheptane, N,N'-diethylethylenediamine, N,N'-diethyl-1,2-diaminopropane, N,N'-diethyl-1,3 -diaminopropane, N,N'-diethyl-1,2-diaminobutane, N,N'-diethyl-1, 3-diaminobutane, N,N'-diethyl-1,4-diaminobutane, N,N'-diethyl-1, 5-diaminopentane, N,N'-diethyl-1, 6-diaminohexane, N,N'-diethyl-1, 7-diaminoheptane, piperazine, 2-methylpiperazine, 2,5-dimethylpiperazine, 2,6-dimethylpiperazine, homopiperazine, 1,1-di-(4-pipendyl)methane, 1,2-di-(4-piperidyl)ethane, 1,3-di-(4-piperidyl)propane, 1,4-di-(4-piperidyl)butane, or tetramethylguanidine.

Among the above, from the viewpoint of increasing the heat resistance and refractive index of a cured product, an active hydrogen compound preferably includes a polythiol compound containing two or more mercapto groups.

The content of the polythiol compound containing two or more mercapto groups with respect to the total mass of the active hydrogen compound is preferably 60% by mass or more, more preferably 70% by mass or more, and still more preferably 80% by mass or more.

In the active hydrogen compound in the first embodiment, the total content of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4, 8-dimercaptomethyl-1,11-dimercapto-3,6,9-trithiaundecane, and pentaerythritol tetrakis(3-mercaptopropionate) with respect to the total mass of the active hydrogen compound is preferably 60% by mass or more, more preferably 70% by mass or more, and still more preferably 80% by mass or more.

In the composition, the molar ratio (NCO groups/(OH groups+SH groups)) of isocyanate groups (NCO groups) in the isocyanate compound to the sum of hydroxyl groups (OH groups) and mercapto groups (SH groups) in the active hydrogen compound is preferably 0.8 or more, more preferably 0.85 or more, and still more preferably 0.9 or more.

In the composition, the molar ratio (NCO groups/(OH groups+SH groups)) of isocyanate groups (NCO groups) in the isocyanate compound to the sum of hydroxyl groups (OH groups) and mercapto groups (SH groups) in the active hydrogen compound is preferably 1.2 or less, more preferably 1.15 or less, and still more preferably 1.1 or less.

<Polymerization Catalyst>

The polymerizable composition for an optical material of the first embodiment contains at least one polymerization catalyst.

The polymerization catalyst is not particularly restricted, and for example, a basic catalyst, an organometallic catalyst, a zinc carbamate, an ammonium salt, a sulfonic acid, or the like can be used.

The above-described polymerization catalysts may be used singly, or two or more kinds thereof may be used in an appropriate combination.

(Basic Catalyst)

Examples of the basic catalyst include an amine catalyst (including an imidazole catalyst).

Examples thereof include a tertiary amine catalyst such as triethylenediamine, N,N-dimethylethanolamine, triethylamine, or N-ethylmorpholine; 2-methylpyrazine, pyridine, α-picoline, β-picoline, γ-picoline, 2,6-lutidine, 3,5-lutidine, 2,4,6-collidine, 3-chloropyridine, N,N-diethylaniline, N,N-dimethylaniline, hexamethylenetetramine, quinoline, isoquinoline, N,N-dimethyl-p-toluidine, N,N-dimethylpiperazine, quinaldine, 4-methylmorpholine, triallylamine, trioctylamine, 1.2-dimethylimidazole, and 1-benzyl-2-methylimidazole.

Among the above, an amine catalyst is preferable as a basic catalyst.

Examples of the amine catalyst include 3,5-lutidine; 2,4, 6-collidine; and a tertiary amine catalyst such as triethylenediamine, N,N-dimethylethanolamine, triethylamine, or N-ethylmorpholine.

The above-described amine catalyst preferably contains at least one selected from the group consisting of 3,5-lutidine, 2,4,6-collidine, triethylenediamine, N,N-dimethylethanolamine, and N-ethylmorpholine.

The basic catalyst also preferably contains a compound represented by the following Formula (2) and/or a compound represented by the following Formula (3).

(2)

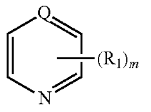

In Formula (2), $R_1$ represents a linear alkyl group having from 1 to 20 carbon atoms, a branched alkyl group having from 3 to 20 carbon atoms, a cycloalkyl group having from 3 to 20 carbon atoms, or a halogen atom, and a plurality of R is may be the same or different. Q represents a carbon atom or a nitrogen atom. m is an integer from 0 to 5.

(3)

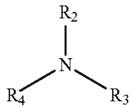

In Formula (3), $R_2$, $R_3$, and $R_4$ each independently represent a linear alkyl group having from 3 to 20 carbon atoms, a branched alkyl group having from 3 to 20 carbon atoms, a cycloalkyl group having from 3 to 20 carbon atoms, an allyl group, or a hydrocarbon group containing a hydroxyl group.

The basic catalyst preferably has a pKa value of 1 or higher, more preferably has a pKa value of 3 or higher, and still more preferably has a pKa value of 4 or higher.

The basic catalyst preferably has a pKa value of 9 or less, and more preferably has a value of 8 or less.

The pKa value (acid dissociation index) can be measured by, for example, (a) a method described in *The Journal of Physical Chemistry* vol. 68, number 6, page 1560 (1964), or (b) a method using a potentiometric automatic titrator (AT-610 (trade name) or the like) manufactured by Kyoto Electronics Industry Co., Ltd., and (c) the acid dissociation index described in *the Chemical Handbook* edited by The Chemical Society of Japan (revised 3rd edition, published by Maruzen Corporation on Jun. 25, 1984) can be used.

(Organometallic Catalyst)

Examples of the organometallic catalyst include an organotin catalyst; an organic acid salt of iron, nickel, zinc, or the like; an acetylacetonate complex; a catalyst composition composed of a carboxylic acid metal compound and a quaternary ammonium salt compound; a catalyst composition composed of a bicyclic tertiary amine compound and a quaternary ammonium salt compound; and a metal catalyst in which an alkoxy group, carboxy group, or the like is coordinated to titanium or aluminum.

Among the above organometallic catalysts, an organotin catalyst is preferable.

Examples of the organotin catalyst include dibutyltin dichloride (DBC), dimethyltin dichloride (DMC), dibutyltin dilaurate (DBTDL), and dibutyltin diacetate.

The above-described organotin catalyst preferably contains at least one selected from the group consisting of dibutyltin dichloride, dimethyltin dichloride, dibutyltin dilaurate, and dibutyltin diacetate.

The polymerization catalyst preferably contains at least one selected from the group consisting of a basic catalyst having a pKa value of from 4 to 8, and an organometallic catalyst.

The polymerization catalyst also preferably contains at least one selected from the group consisting of an amine catalyst and an organotin catalyst.

The polymerization catalyst preferably contains at least one selected from the group consisting of 3,5-lutidine, 2,4,6-collidine, triethylenediamine, N,N-dimethylethanolamine, triethylamine, N-ethylmorpholine, dibutyltin dichloride, dimethyltin dichloride, dibutyltin dilaurate, and dibutyltin diacetate.

The polymerizable composition for an optical material of the first embodiment has a content of the polymerization catalyst with respect to a total of 100 parts by mass of the two or more different monomers for an optical material of from 0.010 parts by mass to 0.50 parts by mass.

The content of the polymerization catalyst in the first embodiment is a large amount compared to a conventional method of producing an optical material.

This allows the reaction heat (or heat from self-heating) of the polymerizable composition for an optical material to be generated in a short time when monomers for an optical material in a polymerizable composition for an optical material are polymerized in a curing process. As a result, a polymerization reaction can be favorably promoted, and high-quality an optical material can be obtained in a shorter time than before, while increasing the viscosity of the polymerizable composition and suppressing thermal convection, which is presumed to cause striae, as described below.

When the content of the polymerization catalyst to the total of 100 parts by mass of the two or more different monomers for an optical material is 0.010 parts by mass or more, a polymerization reaction can be promoted well, and therefore a high-quality optical material can be obtained in a short time. By promoting the polymerization reaction well, the mold release property when a cured product is removed from a mold can be improved.

From the viewpoint of the above, the content of the polymerization catalyst to the total of 100 parts by mass of the two or more different monomers for an optical material is preferably 0.02 parts by mass or more, and more preferably 0.03 parts by mass or more.

When the content of the polymerization catalyst with respect to the total of 100 parts by mass of the two or more different monomers for an optical material is 0.50 parts by mass or less, for example, the handling property when casting the polymerizable composition for an optical material into a mold can be improved.

From the above-described viewpoint, the content of the polymerization catalyst to the total of 100 parts by mass of the two or more different monomers for an optical material is preferably 0.20 parts by mass or less, more preferably 0.10 parts by mass or less, and still more preferably 0.09 parts by mass or less.

The content of the polymerization catalyst may be set appropriately depending on the type of polymerization catalyst, the type and amount of monomers (isocyanate compounds, active hydrogen compounds, other components, and the like) to be used, and a desired shape of a molded body.

The range of polymerization catalyst content described above may be appropriately changed depending on the type of monomer for an optical material and polymerization catalyst.

The polymerization catalyst preferably satisfies the following Condition 1.

[Condition 1]

−Ea/R is from −7,100 to −2,900.

(wherein Ea is an activation energy calculated by an Arrhenius plot from reaction rate constants of the two or more different monomers for an optical material at two or more different temperatures, and R is the gas constant 8.314 J/mol/K.)

When the polymerization catalyst satisfies Condition 1, variations in the polymerization rate can be suppressed in the process of polymerization and curing of the polymerizable composition, and as a result, optical distortion and striae can be suppressed and an optical material having superior appearance can be obtained.

The value of Ea is calculated by the following method.

The value of Ea is calculated by carrying out a process of acquiring physical properties in which, when a composition 1 containing a polymerization reactive compound and a predetermined amount of a polymerization catalyst is heated and kept at a plurality of temperatures, physical properties la derived from a functional group of the polymerization reactive compound before heating and physical properties 1b derived from a residual functional group of the polymerization reactive compound after heating for a predetermined period of time are acquired;

a residual functional group rate calculation process in which a residual functional group rate 1 at a plurality of the temperatures are calculated from the properties 1a and the physical properties 1b;

a reaction rate constant calculation process in which a reaction rate constant 1 at a plurality of the temperatures is calculated from the residual functional group rate 1 based on a reaction rate equation; and a fitting process in which an activation energy Ea1 and a frequency factor A1 are calculated from the reaction rate constants 1 at a plurality of the temperatures by an Arrhenius plot.

The calculated Ea is used to determine whether the polymerization catalyst satisfies Condition 1 or not.

The specific aspects of the method for calculating the value of Ea and the method for determining whether or not the polymerization catalyst satisfies Condition 1 are the same as those described in WO2020/256057.

(Other Additives)

The polymerizable composition for an optical material of the first embodiment may include an optional additive.

Examples of the optional additive include a photochromic compound, an internal mold release agent, a bluing agent, and an ultraviolet absorber.

(Photochromic Compounds)

Photochromic compounds are compounds whose molecular structure is reversibly changed by light irradiation at a specific wavelength, and whose absorption characteristics (absorption spectrum) are changed accordingly.

Examples of the photochromic compound used in the first embodiment include a compound whose absorption characteristics (absorption spectrum) changes depending on the specific wavelength of light.

In the first embodiment, the photochromic compound is not particularly restricted, and any conventionally known compound that can be used for photochromic lenses can be selected and used as appropriate. For example, one or more of the following compounds can be used depending on the desired coloration: a spiropyran compound, a spirooxazine compound, a fulgidic compound, a naphthopyran compound, and a bisimidazole compound.

(Internal Mold Release Agent)

Examples of the internal mold release agent include an acid phosphate ester. Examples of the acid phosphate ester include a phosphoric acid monoester and a phosphoric acid diester, which can be used singly or in a mixture of two or more kinds thereof (Bluing Agent)

Examples of a bluing agent include a substance that has an absorption band in the orange to yellow wavelength region of the visible light range and has a function of adjusting the hue of an optical material made of a resin. Specific examples of the bluing agent further include a substance that exhibits a blue to violet color.

(Ultraviolet Absorber)

Examples of the ultraviolet absorber to be used include a benzophenone ultraviolet absorber such as 2,2'-dihydroxy-4-methoxybenzophenone; a triazine ultraviolet absorber such as 2-[4-[(2-hydroxy-3 -dodecyloxypropyl)oxy] -2-hydroxyphenyl]4,6-bis(2,4-dimethylphenyl)-1, 3,5-triazine; and a benzotriazole ultraviolet absorber such as 2-(2H-benzotriazol-2-yl)-4-methylphenol, or 2-(2H-benzotriazol-2-yl)-4-tent-octylphenol, and preferable examples thereof include a benzotriazole ultraviolet absorber such as 2-(2H-benzotriazol-2-yl)-4-tent-octylphenol or 2-(5-chloro-2H-benzotriazol-2-yl)-4-methyl-6-tent-butylphenol. These ultraviolet absorbers may be used singly or in combination of two or more kinds thereof.

(Viscosity)

From the viewpoint of suppressing striae, the polymerizable composition for an optical material of the first embodiment has a viscosity measured with a B-type viscometer at 25° C. and 60 rpm of 10 mPa·s or more, and preferably 40 mPa·s or more, more preferably 70 mPa·s or more, still more preferably 80 mPa·s or more, particularly preferably 100 mPa·s or more, and still more preferably 120 mPa·s or more.

From the viewpoint of maintaining favorable handling properties when molding an optical material into desired shapes, the polymerizable composition for an optical material of the first embodiment has a viscosity measured with a B-type viscometer at 25° C. and 60 rpm of 1,000 mPa·s or less, preferably 700 mPa·s or less, and more preferably 400 mPa·s or less.

The viscosity of the polymerizable composition for an optical material of the first embodiment may be adjusted depending on the application of a cured product to be obtained.

For example, when a mold for plus lenses is used to obtain a cured product, the end face (or the injection port) is narrow (for example, from 1 mm to 3 mm), and therefore, the polymerizable composition for an optical material of the first embodiment preferably has the viscosity of from 10 mPa·s to 100 mPa·s from the viewpoint of suppressing striae.

On the other hand, when a mold for ordinary lenses other than plus lenses is used to obtain a cured product, the end face (or the injection port) is wide (for example, from 5 mm to 15 mm), and therefore, the polymerizable composition for an optical material of the first embodiment preferably has the viscosity of from 10 mPa·s to 1,000 mPa·s, and more preferably from 100 mPa·s to 1,000 mPa·s, from the viewpoint of suppressing striae.

By increasing the viscosity of the polymerizable composition for an optical material, thermal convection due to the temperature difference between the inside and outside of the composition can be suppressed when heat is applied to the composition from the outside, thereby reducing striae derived from thermal convection.

However, when the amount of catalyst is small, the rate of thickening during polymerization is not sufficient, and the maximum temperature difference is not large enough to suppress thermal convection, and therefore, the temperature cannot be increased rapidly in a short time. Furthermore, the time required to complete the polymerization is also longer.

On the other hand, the disclosure allows the viscosity of the composition as a whole to be increased more rapidly by increasing the amount of catalyst to an optimum range, taking into account the reactivity of the isocyanate compound containing an aromatic ring. As a result, thermal convection due to rapid temperature rise can be suppressed while controlling unevenness in polymerization, and polymerization can proceed in a short time.

(Thixotropy Ratio)

The polymerizable composition for an optical material of the first embodiment preferably has a thixotropy ratio of 1.3 or less, more preferably 1.2 or less, and still more preferably 1.1 or less.

When the thixotropy ratio of the polymerizable composition for an optical material of the first embodiment is 1.3 or less, the composition can be quickly filled into a polymerization container, such as a mold as described below, and thermal convection during polymerization can be suppressed to further prevent generation of striae or the like in the monomer for an optical material. As a result, generation of striae or the like can be suppressed in an optical material to be obtained, and favorable quality can be maintained.

The polymerizable composition for an optical material of the first embodiment preferably has a thixotropy ratio of 0.9 or higher, more preferably 0.95 or higher, and still more preferably 1.0 or higher.

The thixotropy ratio is calculated by dividing a viscosity Ili measured with a B-type viscometer at 25° C. and a rotation speed of 6 rpm by a viscosity 112 measured at a rotation speed of 60 rpm.

The thixotropy ratio can be reduced, for example, by reducing the molecular weight of two or more monomers for an optical material, by restricting the degree of polymerization of a prepolymer to below a certain level, or by reducing the ratio of the structure that gives elasticity in a monomer.

The polymerizable composition for an optical material of the first embodiment preferably contains two or more different monomers for an optical material, a polymerization catalyst, and a prepolymer that is a polymer of two or more different monomers for an optical material and contains a polymerizable functional group.

A prepolymer is a polymer of two or more different monomers for an optical material and contains a polymerizable functional group.

A cured product obtained by polymerizing a prepolymer and two or more different monomers for an optical material can be used as an optical material.

Examples of the prepolymer include a polymer in which two of the monomers for an optical material are not polymerized at an equivalent ratio of 1:1, and a polymer in which two of the monomers for an optical material are polymerized at an unbalanced equivalent ratio.

The above-described polymerizable functional group is a functional group capable of polymerizing with another polymerizable functional group, and specific examples thereof include a functional group containing an active hydrogen, such as an isocyanate group or a mercapto group as described below.

Polymerization at an equivalent ratio of 1:1 means, for example, that when polymerizing using an isocyanate compound and a polythiol compound, isocyanate groups of the isocyanate compound and mercapto groups of the polythiol compound are polymerized at a molar ratio of 1:1.

«Polymerizable Prepolymer Composition for an Optical Material»

The polymerizable prepolymer composition for an optical material of the first embodiment is a polymerizable prepolymer composition for an optical material that contains a prepolymer that is a polymer of two or more different monomers for an optical material and that contains a polymerizable functional group, a polymerization catalyst, wherein at least one of the two or more different monomers for an optical material is an isocyanate compound containing an aromatic ring, and the viscosity measured with a B-type viscometer at 25° C. and 60 rpm is from 10 mPa·s to 2,000 mPa·s.

Specific examples, preferable specific examples, preferable aspects, and the like for monomers for an optical material of polymerizable prepolymer compositions for an optical material and polymerization catalysts are the same as the specific examples, preferable specific examples, preferable aspects, and the like for monomers for an optical material and polymerization catalysts described in the section on the polymerizable compositions for an optical material.

The definition of prepolymer of the polymerizable prepolymer composition for an optical material is the same as the definition of prepolymer described in the section on the polymerizable composition for an optical material.

Specific examples, preferable specific examples, preferable aspects, and the like of isocyanate compounds containing an aromatic ring contained as monomers for an optical material of the polymerizable prepolymer composition for an optical material and the viscosity are the same as the specific examples, preferable specific examples, preferable aspects, and the like described in the section on the polymerizable composition for an optical material.

The polymerizable prepolymer composition for an optical material of the first embodiment preferably has a content of the polymerization catalyst with respect to a total of 100 parts by mass of the two or more different monomers for an optical material of from 0.002 parts by mass to 0.50 parts by mass.

When the content of the polymerization catalyst to the total of 100 parts by mass of the two or more different monomers for an optical material is 0.002 parts by mass or more, a polymerization reaction can be promoted favorably, and therefore a high-quality optical material can be obtained in a short time. By promoting the polymerization reaction favorably, the mold release property when a cured product is removed from a mold can be improved.

From the above-described viewpoint, the content of the polymerization catalyst to the total of 100 parts by mass of the two or more different monomers for an optical material is preferably 0.001 parts by mass or more, more preferably 0.050 parts by mass or more, and still more preferably 0.070 parts by mass or more.

When the content of the polymerization catalyst to the total of 100 parts by mass of two or more different monomers for an optical material is 0.50 parts by mass or less, for example, the handling property when casting the polymerizable composition for an optical material into a mold can be improved.

From the above-described viewpoint, the content of the polymerization catalyst to the total of 100 parts by mass of the two or more different monomers for an optical material is preferably 0.15 parts by mass or less, and more preferably 0.10 parts by mass or less.

(Thixotropy Ratio)

The thixotropy ratio of the polymerizable prepolymer composition for an optical material of the first embodiment is preferably 1.3 or less, more preferably 1.2 or less, and still more preferably 1.1 or less.

When the thixotropy ratio of the polymerizable prepolymer composition for an optical material of the first embodiment is 1.3 or less, the composition can be quickly filled into a polymerization container, such as a mold as described below, and heat convection during polymerization can be suppressed to further prevent generation of striae, or the like, in the monomer for an optical material. As a result, generation of striae and the like can be suppressed in an optical material to be obtained, and favorable quality can be maintained.

The polymerizable composition for an optical material of the first embodiment preferably has a thixotropy ratio of 0.9 or higher, more preferably 0.95 or higher, and still more preferably 1.0 or higher.

The measurement method of the thixotropy ratio is as described above.

From the viewpoint of the handling property of the composition, in the polymerizable prepolymer composition for an optical material of the first embodiment, a prepolymer may preferably contain an isocyanate group.

In other words, it is preferable that not all of isocyanate groups contained in the prepolymer are polymerized, and only some of the isocyanate groups are polymerized, and it is preferable that 70% or more of the isocyanate groups contained in the isocyanate compound used to produce a prepolymer composition remain unpolymerized.

When the prepolymer contains an isocyanate group, in other words, the prepolymer contains more isocyanate compound than other monomers for an optical material that can polymerize with the isocyanate compound, the viscosity of the polymerizable prepolymer composition for an optical material can be kept low when the viscosity of the other monomer for an optical material is high, which facilitates handling of the composition. In particular, when one or more monomers selected from the group consisting of 5,7-dimercaptomethyl-1,11-dimercapto-3 ,6,9-trithiaundecane, 4,7-dimercaptomethyl-1,11-dimercapto-3,6,9-trithiaundecane, 4, 8-dimercaptomethyl-1,11-dimercapto-3,6,9-trithiaundecane, and pentaerythritol tetrakis(3-mercaptopropionate) are contained as the other monomers for an optical material, a prepolymer preferably contains an isocyanate group from the viewpoint of the handling property.

In the polymerizable prepolymer composition for an optical material of the first embodiment, it is also preferable that a prepolymer contains substantially no isocyanate groups.

"A prepolymer contains substantially no isocyanate groups" means that almost all of isocyanate groups have been polymerized.

Specifically, "a prepolymer contains substantially no isocyanate groups" means that the content of isocyanate groups in the prepolymer is below the detection limit when measured with an IR spectrometer.

When a prepolymer contains substantially no isocyanate groups, there are substantially no highly reactive isocyanate groups, and therefore, the stability of the polymerizable prepolymer composition for an optical material can be improved.

In the polymerizable prepolymer composition for an optical material of the first embodiment, the value obtained by subtracting the refractive index B of the prepolymer raw material composition, which is a composition before forming a prepolymer and which is a composition containing two or more different monomers for an optical material and a polymerization catalyst, from the refractive index A of the polymerizable prepolymer composition for an optical material (also referred to as "refractive index A−refractive index B") is preferably more than 0, more preferably 0.005 or more, and still more preferably 0.01 or more.

The refractive index A is the refractive index of the polymerizable prepolymer composition for an optical material after polymerization of a monomer and a polymerization catalyst to obtain a prepolymer, and the refractive index B is the refractive index of the prepolymer raw material composition before polymerization of a monomer and a polymerization catalyst to obtain a prepolymer.

When the refractive index A - refractive index B is within the above-described range, it becomes easy to adjust the viscosity of the polymerizable composition for an optical material to a predetermined level. It becomes easy to stabilize the quality (for example, refractive index, or appearance) of a cured product of the polymerizable composition for an optical material.

The refractive index A−refractive index B may be 0.04 or less, or 0.03 or less. When the prepolymer contains an isocyanate group, the refractive index A−refractive index B is preferably 0.005 or more, and more preferably 0.010 or more. The refractive index A−refractive index B is preferably 0.040 or less, and more preferably 0.030 or less.

On the other hand, when the prepolymer contains substantially no isocyanate groups, the refractive index A−refractive index B is preferably 0.005 or more, and more preferably 0.010 or more. The refractive A−refractive index B is preferably 0.035 or less, and more preferably 0.025 or less.

«Cured Product»

The cured product of the first embodiment is a cured product of the polymerizable composition for an optical material of the first embodiment or the polymerizable prepolymer composition for an optical material of the first embodiment.

From the viewpoint of reducing striae, when an amine catalyst is used as a polymerization catalyst, the content of amine in the cured product of the first embodiment is preferably 0.001% by mass or more, more preferably 0.005% by mass or more, and still more preferably 0.01% by mass or more.

From the viewpoint of improving the handling property of the polymerizable composition for an optical material, the content of amine in the cured product of the first embodiment is preferably 0.50% by mass or less, more preferably 0.20% by mass or less, and still more preferably 0.10% by mass or less.

The content of the above-described amines is the content of amines measured by gas chromatography-mass spectrometry from the dichloromethane composition obtained by dispersing a cured material in dichloromethane and by ultrasonic extraction.

From the viewpoint of reducing striae, when an organotin catalyst is used, the cured product of the first embodiment preferably has a tin content of 0.01% by mass or more, more preferably 0.02% by mass or more, and still more preferably 0.03% by mass or more.

From the viewpoint of improving the handling property of the polymerizable composition for an optical material, the content of tin of the cured product of the first embodiment is preferably 0.1% by mass or less, more preferably 0.05% by mass or less, and still more preferably 0.03% by mass or less.

The measurement method of the amine content in a cured product is as follows.

200 mg of a cured product powdered with a metal file and 3 mL of dichloromethane are placed in a centrifuge tube (volume: 10 mL), ultrasonically extracted at room temperature for 10 minutes using an ultrasonic cleaner (manufactured by IUCHI Corporation, US-4), and centrifuged at 4,000 rpm for 10 minutes using a centrifuge (manufactured by KUBOTA Corporation, tabletop small centrifuge 2410).

The supernatant is collected, and the residue is again dispersed in 3 mL of dichloromethane and subjected to the above-described ultrasonic extraction and centrifugation (hereinafter, also referred to as "residue extraction").

After performing the above-described residue extraction two more times, dichloromethane was added to the obtained supernatant liquid to make the total volume 10 mL.

The obtained 10 mL of supernatant is filtered and analyzed with gas chromatography-mass spectrometry (also referred to as GC-MS) (GC-MS system: manufactured by Agilent, 6890GC/5973N MSD, column: CP-Sil 8 CB for Amine (0.25 mm ID×30 m F.T=0.25 μm)) to obtain the peak area value derived from the amine. A calibration curve of the peak area value derived from the obtained amine and the amount of amine is prepared to determine the content of amine in the cured material.

The above-described amine means an amine compound that can be used as a polymerization catalyst, or an amine compound derived from the above-described amine compound.

Particularly in optical applications where optical transparency is required, the degree of opacity of the cured product of the first embodiment is preferably less than 50, and more preferably less than 35.

The degree of opacity is measured by the following method.

Light from a light source (for example, Luminar Ace LA-150A manufactured by Hayashi Repic Co., Ltd.) is transmitted through a cured product in a dark place. An image of the light transmitted through the cured product is input into an image processing device (for example, an image processing device manufactured by Ube Information Systems Inc.), shading processing is performed on the input image, the degree of shading in the processed image is quantified for each pixel, and the value calculated as the average of the numerical values of the degree of shading in the respective pixels is used as the degree of opacity.

The cured product of the first embodiment preferably has no striae with a length of 1.0 mm or more within a radius of 15 mm from the center of a cured product, and more preferably has no striae with a length of 1.0 mm or more within and outside a radius of 15 mm from the center of a cured product.

The cured product of the first embodiment may be more specifically a cured product of two or more different optical monomers, where at least one of the two or more different optical material monomers is an isocyanate compound containing an aromatic ring in which there are no striae of a length of 1.0 mm or more within a radius of 15 mm from the center of the cured product, and the content of amine, as measured by gas chromatography mass spectrometry, is from 0.001% by mass to 0.50% by mass.

The two or more different optical monomers and isocyanate compounds containing an aromatic ring are as described above.

In the cured product of the disclosure, the two or more different optical monomers may contain an isocyanate compound other than an isocyanate compound containing an aromatic ring.

When the two or more different optical monomers include an isocyanate compound that has no aromatic rings and an isocyanate compound that contains an aromatic ring, from the viewpoint of controlling a polymerization reaction, the ratio of the isocyanate compound that has no aromatic rings to the isocyanate compound that has an aromatic ring, in terms of the molar ratio of isocyanate groups, is preferably within the range of from 3:7 to 0:10, and more preferably within the range of from 2:8 to 0:10.

«Production Method of Optical Material»

The method of producing an optical material of the first embodiment includes the following production method A and production method B.

<Production Method A>

A production method A includes a preparation process of preparing a polymerizable composition for an optical material that contains two or more different monomers for an optical material, and a polymerization catalyst, wherein at least one of the two or more different monomers for an optical material is an isocyanate compound containing an aromatic ring, and the content of the polymerization catalyst to the total of 100 parts by mass of the two or more different monomers for an optical material is from 0.010 parts by mass to 0.50 parts by mass; a cast molding process in which the viscosity of the polymerizable composition for an optical material, measured with a B-type viscometer at 25° C. and 60 rpm, is adjusted to from 10 mPa·s to 1,000 mPa·s and cast into a mold; and a curing process in which the polymerizable composition for an optical material is cured by polymerizing two or more different monomers for an optical material in the polymerizable composition for an optical material in the mold.

When the production method A includes the above-described preparation process, the above-described viscosity adjustment process, and the above-described curing process, the quality of an optical material to be obtained can be maintained and the production time of an optical material can be reduced.

The production method A may include the above-described preparation process, the viscosity adjustment process, and the above-described curing process, in the order mentioned.

In the polymerizable composition for an optical material prepared in the preparation process in Production Method A, the content of a polymerization catalyst to the total of 100 parts by mass of the two or more different monomers for an optical material is from 0.010 parts by mass to 0.50 parts by mass. The content of this polymerization catalyst is a large amount compared to conventional production methods for an optical material.

This allows the reaction heat (or heat from self-heating) of the polymerizable composition for an optical material to be generated in a short time when polymerizing the monomers for an optical material in the polymerizable composition for an optical material in the curing process.

Since the above-described reaction heat can be utilized to promote a polymerization reaction of monomers for an optical material in a polymerizable composition for an optical material, high-quality an optical material can be obtained in a shorter time than before.

Conventionally, a polymerizable composition for an optical material has been heated mainly to generate a polymerization reaction, whereas in Production Method A, heating of the polymerizable composition for an optical material is not necessarily required.

Since Production Method A also utilizes the self-heating of a composition, polymerization can proceed without excessive dependence on the supply of heat from an external source, and therefore, together with increasing the viscosity of the composition as described below, heat unevenness and heat convection in the polymerizable composition for an optical material can be suppressed, and generation of striae can be suppressed.

In the disclosure, striae are a condition in which the refractive index of a particular portion differs from the surrounding normal refractive index. Striae can also be described as a condition that is detrimental to a desired application of an optical material. Striae in an optical material are one kind of defect.

<Preparation Process>

Production Method A includes a preparation process of preparing a polymerizable composition for an optical material containing two or more different monomers for an optical material, and a polymerization catalyst, wherein at least one of the two or more different monomers for an optical material is an isocyanate compound containing an aromatic ring, the content of the polymerization catalyst with respect to the total of 100 parts by mass of the two or more different monomers for an optical material is from 0.010 parts by mass to 0.50 parts by mass.

The preparation process may be a process of simply preparing a pre-produced polymerizable composition for an optical material, or may be a process of producing a polymerizable composition for an optical material.

The preparation process is not particularly restricted as long as the polymerizable composition for an optical material contains two or more different monomers for an optical material and a polymerization catalyst.

For the polymerizable composition for an optical material, ready-made products may be used, or at least two or more different monomers for an optical material and a polymerization catalyst may be mixed and prepared.

The above-described mixing method is not particularly restricted, and any known method can be used.

The temperature at which each of the above-described components is mixed is not particularly restricted, and is preferably 30° C. or lower, and more preferably room temperature (25° C.) or lower.

From the viewpoint of the pot life of the polymerizable composition for an optical material to be prepared, the temperature may be preferably set even lower than 25° C. However, when the solubility of an additive such as an internal mold release agent and each of the above-described components is not favorable, the temperature of each of the above-described components may be raised in advance to dissolve the above-described additive in each of the above-described components.

Each of the above-described components is preferably mixed under dry inert gas to prevent moisture from entering the polymerizable composition for an optical material.

The preparation process is preferably a process of producing a polymerizable composition for an optical material by pre-mixing a portion of the two or more different monomers for an optical material with the polymerization catalyst, and then further mixing the balance of the two or more different monomers for an optical material.

This prevents polymerization of a portion of the monomers for two or more different an optical material and the balance of the monomers for two or more different an optical material from occurring until the mixture containing a portion of the above-described monomers for two or more different an optical material and the above-described polymerization catalyst is mixed with a mixture that does not contain the above-described polymerization catalyst and contains the balance of the above-described monomers for two or more different an optical material.

Therefore, the start time of polymerization can be adjusted by performing the preparation processes in the above order. Therefore, for example, the handling property when injecting the polymerizable composition for an optical material into a mold can be improved.

In the preparation process, after the polymerization catalyst is pre-mixed with a portion of the monomers for two or more different an optical material, the balance of above-described monomers for two or more different an optical material may be mixed in a single step or divided into a plurality of steps.

Examples of a specific aspect of the preparation process include the following aspect.

First, a portion of a monomer for an optical material and an additive (for example, an internal mold release agent) are charged to prepare a mixed liquid. After stirring this mixed liquid for one hour at 25° C. to completely dissolve each component, a portion of the remaining monomer for an optical material is further charged, and the mixture is stirred to make a uniform solution. Defoaming is performed on this solution to obtain a first mixed liquid.

Next, the balance of the monomers for an optical material and a catalyst are stirred at 25° C. for 30 minutes to dissolve them completely to obtain a second mixed liquid.

Then, the first mixed liquid and the second mixed liquid are mixed to obtain a polymerizable composition for an optical material as a uniform solution.

<Viscosity Adjustment Process>

Production method B includes a cast molding process in which the viscosity of the polymerizable composition for an optical material, measured with a B-type viscometer at 25° C. and 60 rpm, is adjusted to from 10 mPa·s to 1,000 mPa·s and the composition is cast molded into a mold.

By adjusting the viscosity of the polymerizable composition for an optical material within the above-described range and cast molding the composition, the viscosity of the polymerizable composition for an optical material to be produced in the process of producing the polymerizable composition for an optical material can be made within an appropriate range from the viewpoint of suppressing striae in an optical material to be obtained.

From the above-described viewpoint, the viscosity of the polymerizable composition for an optical material is 10 mPa·s or higher, and preferably 40 mPa·s or higher, more preferably 70 mPa·s or higher, still more preferably 80 mPa·s or higher, particularly preferably 100 mPa·s or higher, and still more preferably 120 mPa·s or higher.

From the viewpoint of maintaining favorable handling property when molding the optical material into a desired shape, the viscosity of the polymerizable composition for an optical material is 1,000 mPa·s or less, preferably 700 mPa·s or less, and more preferably 400 mPa·s or less.

The method of adjusting the viscosity of the polymerizable composition for an optical material is not restricted.

For example, the viscosity of the polymerizable composition for an optical material may be adjusted by adding a high viscosity compound, heating, stirring, or other methods.

<Curing Process>

Production Method A includes a curing process of curing the polymerizable composition for an optical material by polymerizing the two or more different monomers for an optical material in the polymerizable composition for an optical material in a mold.

Since Production Method A includes a curing process, the polymerizable composition for an optical material can be polymerized, and an optical material can be produced.

Conventionally, when a polymerization reaction is carried out, the polymerization reaction is generated by heating the polymerizable composition for an optical material. The polymerizable composition for an optical material in Production Method A can promote the polymerization reaction of the monomers for an optical material in the polymerizable composition for an optical material by increasing the reaction heat (or heat from self-heating) associated with the polymerization reaction.

Therefore, in Production Method A, the polymerizable composition for an optical material is not necessarily heated, but may be heated.

In other words, in the curing process of Production Method A, the polymerizable composition for an optical material can be cured by polymerization by leaving the polymerizable composition for an optical material to stand still.

The environment in which a curing process is carried out is not particularly restricted, and a mold can be heated and cured from outside the mold. However, from the viewpoint of polymerizing in a short time while improving optical quality such as striae, the process is preferably a process in which the polymerizable composition for an optical material is cured by allowing the polymerizable composition for an optical material to stand still in a closed system space.

By placing the polymerizable composition for an optical material in a closed space, heat generated by self-heating of the polymerizable composition for an optical material can be prevented from being released to the outside. This allows the heat generated by the self-heating to be retained in the closed space, which promotes the polymerization reaction more efficiently and allows an optical material to be produced in a shorter time.

Examples of the closed system space include a heat-insulated environment. A heat-insulated environment refers to an environment in which heat is retained inside and the conduction of heat between the inside and the outside is suppressed. An environment in which the conduction of heat between the inside and the outside is suppressed means an environment in which the conductivity of heat between the inside and the outside of a closed system is such that the polymerizable composition for an optical material can be cured when the polymerizable composition for an optical material is placed still in the closed system space.

A heat-insulated environment can be created, for example, by using a heat-insulating material.

Specifically, by placing the polymerizable composition for an optical material in a heat-insulated container made of heat-insulating material, heat can be retained inside the heat-insulated container and the conduction of heat between the inside and the outside can be suppressed.

The thermal conductivity of the heat-insulating material is preferably 0.50 W/mK or less, more preferably 0.10 W/mK or less, and still more preferably 0.05 W/mK or less.

The density of the heat-insulating material is preferably 10 $kg/m^3$ or higher, more preferably 15 $kg/m^3$ or higher, and still more preferably 20 $kg/m^3$ or higher.

In “heat-insulating” or “heat-insulated environment” in Production Method A, it is preferable to heat a heat-insulated reaction vessel to a thermostatic state (thermostatic reaction vessel) within a range that does not interfere with a polymerization reaction due to reaction heat of the polymerizable composition for an optical material or excessively promote the polymerization reaction of the polymerizable composition for an optical material by external heating.

This allows the environmental temperature in the reaction vessel (thermostatic reaction vessel) in which a mold is placed to be kept at a heat-retained state or at a thermostatic state depending on the temperature increased due to self-heating of monomers for an optical material, or the like, thereby promoting the polymerization reaction more favorably.

As a heat-insulated environment, for example, a heat-insulated reaction vessel or a thermostatic reaction vessel as described above can be used.

For example, heat-insulated polymerization in a heat-insulated environment using a heat-insulated reaction vessel (thermostatic reaction vessel) can be performed by the following procedure when a mold into which a monomer has been injected is placed in a vacuum container that is a heat-insulated reaction vessel.

The inner surface of the vacuum container is covered with a member having heat insulation and heat retention properties such as urethane foam, or cork, and the mold into which the monomer has been injected is wrapped with a member such as a cloth if necessary. Then, the mold injected with the monomer is allowed to stand still in the above-described vacuum container.

The above-described curing process may be a process of curing the polymerizable composition for an optical material by allowing the polymerizable composition for an optical material to stand still without heating from outside.

As described above, in Production Method A, the polymerizable composition for an optical material does not necessarily need to be heated.

In order to heat from outside, a device may be used, which may increase the economic burden. Production method A can reduce the economic burden because an optical material can be produced by a simple method.

The above-described curing process is preferably a process in which the polymerizable composition for an optical material is cured by allowing the composition to stand still for from 2 to 10 hours.

According to conventional methods, a polymerization reaction is generally carried out over several hours to several tens of hours (for example, about from 20 hours to 48 hours) while the temperature is gradually raised by heating.

When the time for the polymerization reaction is short, an optical material cannot be obtained or the quality of the an optical material is degraded because the polymerizable composition for an optical material is not completely cured.

However, according to Production Method A, an optical material can be produced in a short time while maintaining the quality of an optical material to be obtained. Specifically, an optical material can be produced by allowing the polymerizable composition for an optical material to stand still for 10 hours or less.

From the above point of view, it is more preferable to allow the polymerizable composition for an optical material to stand still for 8 hours or less in the curing process.

From the viewpoint of obtaining an optical material that has undergone a polymerization reaction and has been well cured, the polymerizable composition for an optical material is preferably allowed to stand still for 2 hours or more, and more preferably allowed to stand still for 5 hours or more.

In the curing process, a microwave irradiation process in which a microwave is irradiated to the polymerizable composition for an optical material for a predetermined period of time may be provided, if necessary.

Examples of one aspect of the curing process include an aspect that includes the following Process a and Process b.

Process a: The polymerizable composition for an optical material is injected (cast molded) into a mold (in a cavity of the mold).

Process b: The mold into which the polymerizable composition for optical material is injected is allowed to stand still in a closed space for a predetermined period of time to undergo heat-insulated polymerization.

(Process a)

First, the polymerizable composition is injected into a molding mold (mold) held by a gasket or tape. At this time, depending on the physical properties required for an optical material to be obtained, it is preferable to perform defoaming treatment under reduced pressure or filtration treatment under pressure or reduced pressure, or the like, if necessary.

(Process b)

Although the polymerization conditions are not limited, it is preferable to adjust the conditions according to the composition of the polymerizable composition for an optical material, the type and amount of catalyst to be used, and the shape of a mold.

The mold injected with the polymerizable composition for an optical material may be allowed to stand still in a heat-insulated environment for from 2 to 4 hours for polymerization.

In Process b, if necessary, a heating process may be added after the heat-insulated polymerization process in which the mold injected with the polymerizable composition for an optical material is allowed to stand still for a predetermined period of time in a heat-insulated environment.

In Process b, if necessary, in parallel with the process of allowing the mold injected with the polymerizable composition for an optical material to stand still in a heat-insulated environment (heat-insulated polymerization), the mold injected with the polymerizable composition for an optical material may be heated continuously or intermittently at a temperature that does not exceed the self-heating emitted by the polymerizable composition for an optical material in the heat-insulated polymerization process, or the inside of the heat-insulated reaction vessel may be heated to maintain the environmental temperature in the heat-insulated reaction vessel.

<Annealing Process>

Production method A may include, if necessary, an annealing process in which a cured polymerizable composition for an optical material is annealed.

The temperature at which the annealing process is performed is usually from 50 to 150° C., and is preferably from 90 to 140° C., and is more preferably from 100 to 130° C.

<Other Processes>

Production method A may include other processes if necessary. Examples of other processes include an injection process in which the polymerizable composition for an optical material is injected into a mold in the case of producing an optical material using a mold.

<Applications of an Optical Material>

The optical material in Production Method A can be used for plastic lenses, prisms, optical fibers, information recording substrates, filters, light-emitting diodes, and the like.

Among the above, the optical material in the first embodiment can be suitably used for plastic lenses, and is more suitable for plastic lenses for glasses.

<Production Method B>

Production Method B is a method of producing an optical material, the method including:

a preparation process of preparing a total of 100 parts by mass of two or more different monomers for an optical material and from 0.010 parts by mass to 0.50 parts by mass of a polymerization catalyst; and a prepolymerization process of obtaining, by obtaining a prepolymer by mixing a portion of the two or more different monomers for an optical material and at least a portion of the polymerization catalyst and polymerizing at least a portion in a portion of the two or more different monomers for an optical material, a mixture containing the prepolymer, wherein at least one of the two or more different monomers for an optical material is an isocyanate compound containing an aromatic ring.

Production Method B includes a preparation process and a prepolymerization process, which suppresses striae in an optical material to be obtained and reduces the production time of an optical material.

Production Method B preferably includes, in addition to the above-described preparation process and prepolymerization process, a process of producing a polymerizable composition for an optical material in which, by further adding at least the balance of the two or more different monomers for an optical material to the mixture containing the prepolymer, a polymerizable composition for an optical material containing the two or more different monomers for an optical material, the prepolymer, and the polymerization catalyst is obtained; and a curing process in which, by curing the two or more different monomers for an optical material in the polymerizable composition for an optical material, an optical material that is a cured product of the polymerizable composition for an optical material is obtained.

Production Method B includes, in addition to the preparation process and the prepolymerization process, a process of producing a polymerizable composition for an optical material and a curing process, which can more favorably suppress striae in an optical material to be obtained and can more favorably reduce the production time of an optical material.

In the polymerizable composition for an optical material prepared in the preparation process in Production Method B, the content of a polymerization catalyst to the total of 100 parts by mass of the two or more different monomers for an optical material is from 0.010 parts by mass to 0.50 parts by mass. As in the case of Production Method A, the content of this polymerization catalyst is a large amount compared to conventional production methods for an optical material.

Therefore, as in the case of Production Method A, a high-quality optical material with suppressed striae can be obtained in a shorter time than before.

As in the case of Production Method A, heating of the polymerizable composition for an optical material is not necessarily required in Production Method B.

By including a preparation process, a prepolymerization process, a process of producing a polymerizable composition for an optical material, and a curing process, Production Method B can suppress convection in a mold where a polymerization reaction takes place, and can suppress generation of striae in a cured product to be obtained.

Production Method B includes a prepolymerization process, which can more favorably maintain the storage stability of a mixture containing the prepolymer (for example, a polymerizable composition for an optical material) compared to cases without prepolymerization.

For example, when a mixture containing a prepolymer is stored for a certain period of time, a polymerization reaction in the mixture can be suppressed. In other words, a longer pot life can be ensured.

<Preparation Process>

Production Method B includes a preparation process in which a total of 100 parts by mass of two or more different monomers for an optical material and from 0.010 to 0.50 parts by mass of polymerization catalyst are prepared.

In the preparation process, a total of 100 parts by mass of two or more different monomers for an optical material and from 0.010 to 0.50 parts by mass of polymerization catalyst are prepared.

In other words, Production Method B uses polymerization catalyst of from 0.010 to 0.50 parts by mass for a total of 100 parts by mass of two or more different monomers for an optical material.

By using polymerization catalyst of 0.010 parts by mass or more for 100 parts by mass of two or more different monomers for an optical material, a polymerization reaction can be favorably promoted, and therefore a high-quality optical material with suppressed striae can be obtained in a short time. By favorably promoting a polymerization reaction, the mold release property when a cured product is removed from a mold can be improved.

From the above-described viewpoint, a polymerization catalyst is used, with respect to 100 parts by mass of two or more different monomers for an optical material, preferably at 0.015 parts by mass or more, and more preferably at 0.030 parts by mass or more.

The range of polymerization catalyst content described above may be appropriately changed depending on the type of monomer for an optical material and polymerization catalyst.

For example, when the monomer for an optical material contains m-xylene diisocyanate, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, and the polymerization catalyst contains 3,5-lutidine, the polymerization catalyst is used, with respect to 100 parts by mass of two or more different monomers for an optical material, preferably at 0.015 parts by mass or more, and more preferably at 0.020 parts by mass or more.

For example, when the monomer for an optical material contains m-xylene diisocyanate and 4-mercaptomethyl-1,8-dimercapto-3,6-dithiaoctane, and the polymerization catalyst contains 3,5-lutidine, the polymerization catalyst is used, with respect to 100 parts by mass of two or more different monomers for an optical material, preferably at 0.010 parts by mass or more, and more preferably at 0.015 parts by mass or more.

By using polymerization catalyst of 0.50 parts by mass or less for 100 parts by mass of two or more different monomers for an optical material, for example, the handling property when injecting the polymerizable composition for an optical material into a mold can be improved.

From the above-described viewpoint, the polymerization catalyst is used, with respect to 100 parts by mass of two or more different monomers for an optical material, preferably at 0.09 parts by mass or less, more preferably at 0.07 parts by mass or less, and still more preferably at 0.05 parts by mass or less.

The amount of the polymerization catalyst can be set appropriately depending on the type of polymerization catalyst, the type and amount of monomers (isocyanate compounds, active hydrogen compounds, other components, and the like) to be used, and the desired shape of a molded body.

<Prepolymerization Process>

Production Method B includes a prepolymerization process of obtaining, by obtaining a prepolymer by mixing a portion of two or more different monomers for an optical material and at least a portion of a polymerization catalyst and polymerizing at least a portion in a portion of the two or more different monomers for an optical material, a mixture containing the prepolymer.

The inventors considered that convection caused by uneven temperature distribution in a mold where a polymerization reaction takes place is one of the causes of striae in a cured product to be obtained.

Therefore, the inventors focused on the fact that, when a portion of monomers for an optical material is prepolymerized to produce a prepolymer and a polymerizable composition for an optical material contains the prepolymer, the viscosity of the polymerizable composition for an optical material increases. This can suppress convection in a mold.

Production Method B can reduce the temperature difference between the inside and the outside of a mold by preventing the self-heating from escaping to the outside.

In combination with the above-described viewpoints, Production Method B is presumed to be capable of suppressing striae in a cured product to be obtained.

Production Method B can obtain a prepolymer with excellent pot life by including all of one of two or more different optical material monomers, some of the other optical material monomers other than the one described above, and all or part of a polymerization catalyst in a prepolymerization process.

Aspects of “portion of two or more different monomers for an optical material” are not particularly restricted.

For example, “portion of two or more different monomers for an optical material” may be partial amounts of respective two or more different monomers for an optical material.

A “portion of two or more different optical material monomers” may be all of one or more of the two or more different optical material monomers.

In the prepolymerization process, the polymerization catalyst may be used in a portion or in full.

When a portion of the polymerization catalyst is used, aspects of “portion of the polymerization catalyst” are not particularly restricted, as is the case with “portion of two or more different monomers for an optical material”.

For example, “portion of the polymerization catalyst” may be an amount of a portion of the polymerization catalyst.

When a portion of the polymerization catalyst is used as the polymerization catalyst, from the viewpoint of ensuring a long pot life, the portion of the polymerization catalyst in 100 parts by mass of the polymerization catalyst is preferably from 5 to 80 parts by mass, more preferably from 10 to 60 parts by mass, and still more preferably from 15 to 50 parts by mass.

From the viewpoint of ensuring a long pot life, a portion of the two or more monomers for an optical material in 100 parts by mass of the two or more monomers for an optical material is preferably from 5 to 95 parts by mass, more preferably from 20 to 80 parts by mass, and still more preferably from 30 to 70 parts by mass.

Examples of specific aspects of the prepolymerization process are described below, but the prepolymerization process in Production Method B is not restricted to the following aspects.

(Aspect a)

The prepolymerization process of Aspect a is a process in which a portion of two or more different monomers for an optical material and all of a polymerization catalyst are mixed and at least a portion in the portion of two or more different monomers for an optical material is polymerized to obtain a prepolymer, thereby obtaining a mixture containing the prepolymer.

In Aspect a, the portion of two or more different monomers for an optical material is preferably composed of all of one of the two or more different monomers for an optical material and a portion of another monomer for an optical material other than the one monomer for an optical material.

(Aspect b)

The prepolymerization process of Aspect b is a process in which a portion of two or more different monomers for an optical material and a portion of a polymerization catalyst are mixed and at least a portion in the portion of two or more different monomers for an optical material is polymerized to obtain a prepolymer, thereby obtaining a mixture containing the prepolymer.

When Production Method B includes the prepolymerization process of Aspect b, the process of producing a polymerizable composition for an optical material described below is a process in which at least the balance of two or more different monomers for an optical material and the balance of a polymerization catalyst are added to a mixture containing a prepolymer to obtain a polymerizable composition for an optical material containing two or more different monomers for an optical material, the prepolymer, and the polymerization catalyst.

In Aspect b, it is preferable that the two or more different optical material monomers include an isocyanate compound, that a portion of the two or more different optical material monomers include a portion of the isocyanate compound, and that the balance of the two or more different monomers for an optical material include the balance of the isocyanate compound.

<Viscosity Adjustment Process>

Production Method B preferably further includes a viscosity adjustment process to adjust the viscosity of a mixture containing a prepolymer to from 30 mPa·s to 2,000 mPa·s after the prepolymerization process and before the process of producing a polymerizable composition for an optical material.

When the viscosity of a mixture containing a prepolymer is within the above-described range, from the viewpoint of suppressing striae in an optical material to be obtained, the viscosity of a polymerizable composition for an optical material produced in the process of producing a polymerizable composition for an optical material can be made within an appropriate range. As a result, striae in the optical material to be obtained can be suppressed.

From the above-described viewpoint, the viscosity of a mixture containing a prepolymer is preferably from 40 mPa·s to 2,000 mPa·s, and more preferably from 50 mPa·s to 1,800 mPa·s.

The viscosity is measured using a B-type viscometer under the conditions of 25° C. and 60 rpm (revolutions per minute).

Methods for adjusting the viscosity of a mixture containing a prepolymer are not particularly restricted.

For example, the viscosity of a mixture containing a prepolymer may be adjusted by methods such as addition of a high-viscosity compound, heating, and stirring.

The temperature at which a mixture containing a prepolymer is prepared is not particularly limited, as long as the temperature is high enough to obtain the prepolymer by a polymerization reaction. For example, the temperature may be from 20° C. to 50° C., or from 25° C. to 45° C.

The stirring time for preparing a mixture containing a prepolymer is not particularly limited as long as the stirring time is long enough to obtain the prepolymer through a polymerization reaction. For example, the time may be from 30 minutes to 5 hours, or from 1 hour to 5 hours.

Specifically, the method of preparing a mixture containing a prepolymer may be a method of preparing a mixture containing a prepolymer by stirring under the conditions of 40° C. for 3 hours while adjusting the viscosity.

<Process of Producing Polymerizable Composition for An optical material >

Production Method B includes a process of producing a polymerizable composition for an optical material in which, by adding at least the balance of two or more different monomers for an optical material to a mixture containing a prepolymer, a polymerizable composition for an optical material containing the two or more different monomers for an optical material, the prepolymer, and the polymerization catalyst is obtained The process of producing a polymerizable composition for an optical material is a process in which at least the balance of two or more different monomers for an optical material and the balance of a polymerization catalyst are added to a mixture containing a prepolymer to obtain a polymerizable composition for an optical material containing two or more different monomers for an optical material, the prepolymer, and the polymerization catalyst.

This prevents occurrence of polymerization of the prepolymer and the balance of the above-described two or more different monomers for an optical material until the mixture containing the prepolymer and the balance of the above-described two or more different monomers for an optical material are mixed.

Therefore, by carrying out the process of producing a polymerizable composition for an optical material at an appropriate time, for example, the handling property when injecting the polymerizable composition for an optical material into a mold can be improved.

In the process of producing a polymerizable composition for an optical material, when adding the balance of at least two or more different monomers for an optical material to a mixture containing a prepolymer, the balance of two or more different monomers for an optical material may be mixed in a single step or divided into a plurality of steps.

The "balance of two or more different monomers for an optical material" means the balance of two or more different monomers for an optical material with respect to the "portion of two or more different monomers for an optical material" in the prepolymerization process.

The "balance of two or more different monomers for an optical material" may be monomers for an optical material that have functional groups that polymerize with respect to the polymerizable functional groups of the prepolymer, and where the amount of functional groups that polymerize with respect to the polymerizable functional groups of the above-described prepolymer is an amount (or equivalent amount)

that can polymerize with substantially all of the polymerizable functional groups of the prepolymer.

From the viewpoint of improving the optical uniformity of a composition for an optical material, the balance of the two or more different monomers for an optical material preferably contains monomers of the same kind as the monomers for an optical material constituting the prepolymer.

The temperature at which each of the above-described components is mixed is not particularly restricted, and is preferably 30° C. or lower, and more preferably room temperature (25° C.) or lower.

In some cases, the temperature at which each component is mixed may preferably be even lower than 25° C. However, when the solubility of an additive such as an internal mold release agent and each of the above-described components is not favorable, the temperature of each of the above-described components may be raised in advance to dissolve the above-described additive in each of the above-described components.

Examples of specific aspects of the process of producing a polymerizable composition for an optical material include the following aspects.

First, a mixed liquid is prepared by charging an additive (for example, an internal mold release agent) to a mixture containing a prepolymer. This mixed liquid is stirred at 25° C. for 1 hour to completely dissolve each component, and then degassed to obtain a first mixed liquid.

The balance of monomers for an optical material and, if necessary, the balance of polymerization catalyst are stirred at 25° C. for 30 minutes to completely dissolve them to obtain a second mixed liquid.

Then, the first mixed liquid and the second mixed liquid are mixed and degassed after stirring to obtain a polymerizable composition for an optical material as a uniform solution.

<Pumping Process>

Production Method B may further include a pumping process of pumping a polymerizable composition for an optical material into a mold for cast molding after the process of producing a polymerizable composition for an optical material and before the curing process.

The pumping process may be a process in which the polymerizable composition for optical material is pumped into the mold for cast molding while being remixed in a stationary mixer.

The pumping process may be a process of pumping the polymerizable composition for optical material into the mold for cast molding while remixing the composition with a dynamic mixer.

This can eliminate non-uniformity in the distribution of the polymerizable composition for an optical material while pumping the polymerizable composition for an optical material into the mold, thereby suppressing striae of a cured product to be obtained.

<Curing Process>

Production Method B includes a curing process in which two or more different monomers for an optical material in a polymerizable composition for an optical material are cured to obtain an optical material that is a cured product of the polymerizable composition for an optical material.

Specific aspects, preferable aspects, and the like of the curing process in Production B are the same as the details of the specific aspects, the preferable aspects, and the like described in the section of <Curing Process> in the above-described Production Method A.

<Second Prepolymerization Process>

Production Method B may further include, in addition to the above-described preparation process and prepolymerization process, a second prepolymerization process in which the balance of the two or more different monomers for an optical material and the balance of the polymerization catalyst are mixed and at least a portion in the balance of the two or more different monomers for an optical material is polymerized to obtain a second prepolymer, thereby obtaining a mixture containing the second prepolymer;

a process of producing a polymerizable composition for an optical material in which a polymerizable composition for an optical material containing the prepolymer, the second prepolymer, and the polymerization catalyst is obtained by adding the mixture containing the second prepolymer to the mixture containing the prepolymer; and a curing process in which an optical material, which is a cured product of the polymerizable composition for an optical material, is obtained by curing the prepolymer and the second prepolymer in the polymerizable composition for an optical material.

Since Production Method B includes the above-described configuration, a mixture containing a prepolymer obtained by a prepolymerization process and a mixture containing a second prepolymer obtained by a second prepolymerization process can be obtained.

This allows the viscosity of the mixture containing the prepolymer and the mixture containing the second prepolymer to be brought closer together, allowing both to be mixed more easily.

The two or more different monomers for an optical material, polymerization catalysts, specific aspects, preferable aspects, and the like in the second prepolymerization process are the same as the two or more different monomers for an optical material, polymerization catalysts, specific aspects, preferable aspects, and the like in the prepolymerization process.

When Production Method B includes a second prepolymerization process, the process of producing a polymerizable composition for an optical material is a process of obtaining a polymerizable composition for an optical material containing the prepolymer, the second prepolymer, and the polymerization catalyst by adding the mixture containing the second prepolymer to the mixture containing the prepolymer.

The mixture containing the prepolymer, the specific aspects, the preferable aspects, and the like in the above-described process of producing a polymerizable composition for an optical material are the same as the specific aspects, the preferable aspects, and the like in the above-described <Process of Producing Polymerizable Composition for An optical material>.

When Production Method B includes a second prepolymerization process, the curing process is a process in which an optical material that is a cured product of the polymerizable composition for an optical material is obtained by curing the prepolymer and the second prepolymer in the polymerizable composition for an optical material.

The prepolymers, the specific aspects, the preferable aspects, and the like in the above-described curing process are the same as the specific aspects, the preferable aspects, and the like in the above-described <Curing Process>.

<Annealing Process>

Production B may include, if necessary, an annealing process in which a cured polymerizable composition for an optical material is annealed.

The preferable aspects and the like of the annealing process in Production Method B are the same as the preferable aspects and the like of the annealing process in Production Method A.

<Other Processes>

Production Method B may be provided with other processes as necessary. Specific aspects, preferable aspects, and the like of other processes in Production Method B are the same as the specific aspects, the preferable aspects, and the like of the other processes in Production Method A.

<Applications of Optical Material>

Specific examples, preferable specific examples, and the like of applications of an optical material in Production Method B are the same as the specific examples, the preferable specific examples, and the like of the applications of the an optical material in Production Method A.

Second Embodiment

«Method of Producing an Optical Material»

A method of producing an optical material of a second embodiment includes: a preparation process in which a polymerizable composition for an optical material that contains two or more different monomers for an optical material and a polymerization catalyst, and in which the content of the polymerization catalyst with respect to the total of 100 parts by mass of the two or more different monomers for an optical material is from 0.010 parts by mass to 0.50 parts by mass is prepared; and a curing process in which the polymerizable composition for an optical material is cured by polymerizing the two or more different monomers for an optical material in the polymerizable composition for an optical material.

The method of producing an optical material of the second embodiment is the same as the method of producing an optical material of the first embodiment, except that the content of the polymerization catalyst with respect to the total of 100 parts by mass of two or more different monomers for an optical material is from 0.010 parts by mass to 0.50 parts by mass.

Details of specific examples, preferable specific examples, specific aspects, preferable aspects, and the like of each component in the method of producing an optical material of the second embodiment are the same as details of the specific examples, the preferable specific examples, the specific aspects, the preferable aspects, and the like of each component in the method of producing an optical material of the first embodiment.

The second embodiment of the disclosure includes the following aspects.

<2-1> A method of producing an optical material, the method including a preparation process of preparing a polymerizable composition for an optical material that contains two or more different monomers for an optical material and a polymerization catalyst, and in which the content of the polymerization catalyst with respect to the total of 100 parts by mass of the two or more different monomers for an optical material is from 0.010 parts by mass to 0.50 parts by mass, and a curing process in which the polymerizable composition for an optical material is cured by polymerizing the two or more different monomers for an optical material in the polymerizable composition for an optical material.

<2-2> The process of producing an optical material according to <2-1>, wherein the preparation process is a process of producing a polymerizable composition for an optical material by pre-mixing a portion of the two or more different monomers for an optical material with the polymerization catalyst and then further mixing the balance of the two or more different monomers for an optical material.

<2-3> The method of producing an optical material according to <2-1> or <2-2>, wherein the curing process is a process of curing the polymerizable composition for an optical material by allowing the polymerizable composition for an optical material to stand still in a closed system space.

<2-4> The method of producing an optical material according to any one of <2-1> to <2-3>, wherein the curing process is a process of curing the polymerizable composition for an optical material by allowing the polymerizable composition for an optical material to stand still without heating from outside.

<2-5> The method of producing an optical material according to any one of <2-1> to <2-4>, wherein the curing process is a process of curing the polymerizable composition for an optical material by allowing the polymerizable composition for an optical material to stand still for from 2 hours to 10 hours.

<2-6> The method of producing an optical material according to any one of <2-1> to <2-5>, wherein the two or more different monomers for an optical material contain: an isocyanate compound (A); and at least one active hydrogen compound (B) selected from the group consisting of a polythiol compound containing two or more mercapto groups, a hydroxythiol compound containing one or more mercapto groups and one or more hydroxyl groups, a polyol compound containing two or more hydroxyl groups, and an amine compound.

<2-7> The method of producing an optical material according to <2-6>, wherein the isocyanate compound (A) contains an aromatic isocyanate compound.

<2-8> The method of producing an optical material according to any one of <2-1> to <2-7>, wherein the polymerization catalyst contains at least one selected from the group consisting of a basic catalyst having a pKa value of from 4 to 8 and an organometallic catalyst.

<2-9> The method of producing an optical material according to any one of <2-1> to <2-8>, wherein the polymerization catalyst contains at least one selected from the group consisting of an amine catalyst and an organotin catalyst.

<2-10> The method of producing an optical material according to any one of <2-1> to <2-9>, wherein the polymerization catalyst contains at least one selected from the group consisting of 3,5-lutidine, 2,4,6-collidine, triethylenediamine, N,N-dimethylethanolamine, triethylamine, N-ethylmorpholine, dibutyltin dichloride, dimethyltin dichloride, dibutyltin dilaurate, and dibutyltin diacetate.

<2-11> A polymerizable composition for an optical material that contains a polymerization catalyst, and in which the content of the polymerization catalyst with respect to the total of 100 parts by mass of the two or more different monomers for an optical material is from 0.010 parts by mass to 0.50 parts by mass.

EXAMPLES

Polythiol compounds used in Examples can be produced by the method described in WO2014/027665.

Example A

The first and second embodiments of the disclosure are described in detail below by way of Example A, but the first and second embodiments are not limited to these Examples.

The following evaluations were conducted on the molded bodies obtained in each of Examples or Comparative Examples.

(Degree of Opacity)

Light from a light source (Luminar Ace LA-150A manufactured by HAYASHI-REPIC CO., LTD.) was transmitted through a prepared molded body in a dark place. An image of the light transmitted through the molded product was captured by an image processor (manufactured by Ube Information Systems, Inc.), and the captured image was subjected to shading processing. The degree of shading in the processed image was quantified for each pixel, and the average value of the numerical values of the degrees of shading for the individual pixels was obtained to determine the degree of opacity of the molded body.

The obtained degree of opacity was evaluated according to the following criteria.

A: The degree of opacity was less than 35.

B: The degree of opacity was from 35 to less than 50.

C: The degree of opacity was from 50 to less than 100.

D: The degree of opacity was 100 or more.

(Striae)

A molded body with a center thickness of 8 mm and a diameter of 78 mm was projected under an ultra-high pressure mercury lamp (light source model OPM-252HEG: manufactured by USHIO Inc.), and the transmitted image was visually observed and evaluated according to the following criteria.

A: No striae were observed. Specifically, there were no striae with a length of 1.0 mm or more visually observed within or outside a radius of 15 mm from the center of the molded body.

B: Although striae were observed, the molded body was generally acceptable. Specifically, although striae with a length of 1.0 mm or more were observed visually outside the radius of 15 mm from the center of the molded body, striae with a length of 1.0 mm or more were not observed visually within the radius of 15 mm from the center of the molded body, and the molded body was generally acceptable as a product.

C: Striae were observed, and the molded body was unacceptable as a product. Specifically, striae with a length of 1.0 mm or more were observed visually within and outside a radius of 15 mm from the center of the molded body.

(Mold Release Property)

The mold release property of a molded body when the molded body was released from a mold was evaluated according to the following criteria.

A: The molded body was peeled off without applying any force.

B: The molded body was peeled off when force was applied.

C: The molded body was peeled off when force was applied, but there was a possibility that the mold or lens was damaged.

D: The molded body was not be peeled off even when force was applied, and a product could not be obtained.

In Example A and Example B, the −Ea/R of each polymerization catalyst is as follows.

Dibutyltin (II) dichloride −5428

3,5-Lutidine −3723

Example 1A

A mixed liquid was prepared by stirring 0.1 parts by mass of ZelecUN (internal mold release agent) manufactured by Stepan Company, 1.5 parts by mass of Tinuvin 329 (ultraviolet absorber), and 42.0 parts by mass of m-xylene diisocyanate (monomer for an optical material) at 25° C. for 1 hour to complete dissolution. Then, 48 parts by mass of 4-mercaptomethyl-1,8-dimercapto-3,6-dithiaoctane [monomer for an optical material] was added to the obtained mixed liquid, and the mixed liquid was stirred at 15° C. for 5 minutes to make a uniform solution. This solution was defoamed at 400 Pa for 60 minutes to obtain a first mixed liquid.

10.0 parts by mass of m-xylene diisocyanate [monomer for an optical material] and 0.02 parts by mass of 3,5-lutidine [polymerization catalyst] (pKa value=6.14) were stirred at 25° C. for 10 minutes to complete dissolution to obtain a second mixed liquid.

The first mixed liquid and the second mixed liquid were then mixed at 20° C. to obtain a polymerizable composition for an optical material as a uniform solution. The thixotropy ratio of the polymerizable composition for an optical material is shown in Table 1.

This solution was injected at a rate of 10 g/sec into a cavity of a mold with the cavity for preparing lenses having a set center thickness of 8 mm, composed of a 4-curved glass mold (upper mold) with a diameter of 78 mm and a 4-curved glass mold (lower mold) with a diameter of 78 mm, while filtering with a 1 μm PTFE filter. After heat-insulated polymerization by allowing this cast molded product to stand still for 5 hours in a heat-insulated container at 25° C., a cured molded body was released from the mold, and further annealed at 120° C. for 2 hours to obtain a molded body (lens).

The properties of the obtained molded body were measured, and favorable physical properties with a refractive index (ne) of 1.664, an Abbe number (νe) of 31, and a glass transition temperature (Tg) of 88° C. were exhibited. The results of degree of opacity, striae, and mold release property are shown in Table 1.

Example 2A

A molded body was obtained using the same method as in Example 1A, except that the amount of polymerization catalyst was set as described in Table 1.

The properties of the obtained molded body were measured, and favorable physical properties with a refractive index (ne) of 1.664, an Abbe number (νe) of 31, and a glass transition temperature (Tg) of 88° C. were exhibited. The results of degree of opacity, striae, and mold release property are shown in Table 1.

Example 3A

A molded body was obtained using the same method as in Example 1A, except that the amount of polymerization catalyst was set as described in Table 1.

The properties of the obtained molded body were measured, and favorable physical properties with a refractive index (ne) of 1.664, an Abbe number (νe) of 31, and a glass transition temperature (Tg) of 87° C. were exhibited. The results of degree of opacity, striae, and mold release property are shown in Table 1.

Example 4A

A molded body was obtained using the same method as in Example 1A, except that the amount of polymerization catalyst was set as described in Table 1.

The properties of the obtained molded body were measured, and favorable physical properties with a refractive index (ne) of 1.664, an Abbe number (νe) of 31, and a glass transition temperature (Tg) of 88° C. were exhibited. The results of degree of opacity, striae, and mold release property are shown in Table 1.

Molded body was obtained using the same method as in Example 1A, except that the amount of polymerization catalyst was set as described in Table 1.

Example 5A

A mixed liquid was prepared by stirring 0.1 parts by mass of ZelecUN (internal mold release agent) manufactured by Stepan Company, 1.5 parts by mass of Tinuvin 329 (ultraviolet absorber), and 40.7 parts by mass of m-xylene diisocyanate (monomer for an optical material) at 25° C. for 1 hour to complete dissolution, and then, to this mixed liquid, 49.3 parts by mass of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was added, and the mixture was stirred at 15° C. for 5 minutes to make a uniform solution. This solution was defoamed at 400 Pa for 60 minutes to obtain a first mixed liquid.

10.0 parts by mass of m-xylene diisocyanate [monomer for an optical material] and 0.02 parts by mass of 3,5-lutidine [polymerization catalyst] (pKa value=6.14) were stirred at 25° C. for 10 minutes to complete dissolution to obtain a second mixed liquid.

The first mixed liquid and the second mixed liquid were then mixed at 20° C. to obtain a polymerizable composition for an optical material as a uniform solution. The thixotropy ratio of the polymerizable composition for an optical material is shown in Table 1.

The properties of the obtained molded body were measured, and favorable physical properties with a refractive index (ne) of 1.668, an Abbe number (ve) of 31, and a glass transition temperature (Tg) of 100° C. were exhibited. The results of degree of opacity, striae, and mold release property are shown in Table 1.

Example 6A

A cured molded body was obtained using the same method as in Example 5A, except that the amount of catalyst was set as described in Table 1.

The properties of the obtained molded body were measured, and favorable physical properties with a refractive index (ne) of 1.668, an Abbe number (ve) of 31, and a glass transition temperature (Tg) of 98° C. were exhibited. The results of degree of opacity, striae, and mold release property are shown in Table 1.

Example 7A

A cured molded body was obtained using the same method as in Example 5A, except that the amount of catalyst was set as described in Table 1.

The properties of the obtained molded body were measured, and favorable physical properties with a refractive index (ne) of 1.668, an Abbe number (ve) of 31, and a glass transition temperature (Tg) of 99° C. were exhibited. The results of degree of opacity, striae, and mold release property are shown in Table 1.

TABLE 1

| | Polymerizable composition for an optical material | | Polymerization catalyst | | | | | Evaluation | | |
|---|---|---|---|---|---|---|---|---|---|---|
| | Thixotropy ratio | Viscosity (mPa · S) | Type | Content of polymerization catalyst with respect to total of 100 parts by mass of monomer for optical material (parts by mass) | Time of polymerization (standing still) (hr) | With or without heating in polymerization | Polymerization environment | Degree of opacity | Striae | Mold release property |
| Example 1A | 1.0 | 24 | 3,5-lutidine | 0.02 | 5 | None | Heat-insulated | A | B | B |
| Example 2A | 1.0 | 29 | 3,5-lutidine | 0.025 | 5 | None | Heat-insulated | A | B | A |
| Example 3A | 1.0 | 35 | 3,5-lutidine | 0.03 | 5 | None | Heat-insulated | A | B | A |
| Example 4A | 1.0 | 40 | 3,5-lutidine | 0.04 | 5 | None | Heat-insulated | A | B | A |
| Example 5A | 1.0 | 24 | 3,5-lutidine | 0.02 | 5 | None | Heat-insulated | A | B | B |
| Example 6A | 1.0 | 28 | 3,5-lutidine | 0.025 | 5 | None | Heat-insulated | A | B | A |
| Example 7A | 1.0 | 35 | 3,5-lutidine | 0.04 | 5 | None | Heat-insulated | A | B | A |

This solution was injected at a rate of 10 g/sec into a cavity of a mold with the cavity for preparing lenses having a set center thickness of 8 mm, composed of a 4-curved glass mold (upper mold) with a diameter of 78 mm and a 4-curved glass mold (lower mold) with a diameter of 78 mm, while filtering with a 1 μm PTFE filter. After heat-insulated polymerization by allowing this cast molded product to stand still for 5 hours in a heat-insulated container at 25° C., a cured molded body was released from the mold, and further annealed at 120° C. for 2 hours to obtain a molded body (lens).

As shown in Table 1, for Examples in which two or more different monomers for an optical material and a polymerization catalyst are contained, and in which the content of the above-described polymerization catalyst to the total of 100 parts by mass of the above-described two or more different monomers for an optical material is from 0.010 parts by mass to 0.50 parts by mass (preferably from 0.010 parts by mass to 0.05 parts by mass), lenses with favorable quality could be obtained even when the operation time of the polymerization reaction was set to be short.

Example B

The Production Method B of the first embodiment will be described in detail below by way of Example B. However, Production Method B of the first embodiment is not limited to these Examples.

The measurement method of viscosity in Example B is the same as the method described above.

In Example B, the content of amine in a cured product was measured by the method described above.

The following evaluations were conducted on the molded bodies obtained in each of Examples or Comparative Examples.

(Striae)

A molded body was projected under an ultra-high pressure mercury lamp (light source model OPM-252HEG: manufactured by USHIO Inc.), and the transmitted image was visually observed and evaluated according to the following criteria.

A: No striae were observed. Specifically, there were no striae with a length of 1.0 mm or more visually observed within or outside a radius of 15 mm from the center of the molded body.

B: Although striae were observed, the molded body was generally acceptable. Specifically, although striae with a length of 1.0 mm or more were observed visually outside the radius of 15 mm from the center of the molded body, striae with a length of 1.0 mm or more were not observed visually within the radius of 15 mm from the center of the molded body, and the molded body was generally acceptable as a product.

C: Striae were observed, and the molded body was unacceptable as a product. Specifically, striae with a length of 1.0 mm or more were observed visually within and outside a radius of 15 mm from the center of the molded body.

Example 1B

A mixed liquid was prepared by stirring 0.03 parts by mass of JP-506H (manufactured by Johoku Chemical Co., Ltd.) which is an acid phosphate ester, 1.5 parts by mass of Tinuvin 329 [ultraviolet absorber], and 40.7 parts by mass of m-xylene diisocyanate [monomer for an optical material] at 25° C. for 1 hour to complete dissolution, and then 49.3 parts by mass of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane [monomer for an optical material] was charged into this mixed liquid, and the mixture was stirred at 25° C. for 5 minutes to make a uniform solution.

Furthermore, to the obtained uniform solution, 0.015 parts by mass of 3,5-lutidine [polymerization catalyst] (pKa value=6.14) was charged and stirred at 400 Pa and 25° C. for 1 hour with degassing. The monomers for an optical material were polymerized while adjusting the viscosity to obtain a first mixed liquid which is a mixture containing a prepolymer. The viscosity of the mixture containing the prepolymer is shown in Table 2.

A mixed liquid was prepared by charging 10 parts by mass of m-xylene diisocyanate [monomer for an optical material] and 0.010 parts by mass of 3,5-lutidine [polymerization catalyst]. This mixed liquid was stirred at 25° C. for 15 minutes to obtain a second mixed liquid.

Then, the first mixed liquid and the second mixed liquid were mixed at 20° C. to obtain a polymerizable composition for an optical material.

Whether or not the prepolymer contains an isocyanate group is shown in Table 2. The value (also referred to as "refractive index A−refractive index B") obtained by subtracting refractive index B of the prepolymer raw material composition, which is the composition before the prepolymer is formed and contains two or more different monomers for an optical material and a polymerization catalyst from refractive index A of the polymerizable prepolymer composition for an optical material is shown in Table 2.

The obtained polymerizable composition for an optical material was remixed in a stationary mixer and pumped into a mold for cast molding (or mold).

The viscosity (also referred to as cast molding viscosity) of the polymerizable composition for an optical material when pumped into the mold and cast molded into the mold was adjusted to the value shown in Table 2.

When pumping the polymerizable composition for an optical material, the polymerizable composition for an optical material was injected at a rate of 10 g/sec into a cavity of a mold with the cavity for preparing lenses having a set center thickness described in Table 2, composed of a 4-curved or 6-curved glass mold (upper mold) with a diameter of 78 mm and a 4-curved or 2-curved glass mold (lower mold) with a diameter of 78 mm, while filtering with a 1μm PTFE filter.

After heat-insulated polymerization by allowing this cast molded product to stand still for 2 hours in a heat-insulated container at 25° C., the cured molded product was taken out from the heat-insulated container and subjected to further heat polymerization at 120° C. for 1 hour.

A cured molded body was released from the mold, and further annealed at 120° C. for 2 hours to obtain a molded body (lens).

Example 2B

A molded body (lens) was obtained by the same method as in Example 1B, except that the amount of polymerization catalyst and the stirring time of the first mixed liquid in the prepolymerization process were changed to the values shown in Table 2, and the cast molding viscosity of the polymerizable composition for an optical material was adjusted to the value shown in Table 2.

Example 3B

A mixed liquid was prepared by charging 0.03 parts by mass of JP-506H (manufactured by Johoku Chemical Co., Ltd.) which is an acid phosphate ester, 1.5 parts by mass of Tinuvin 329 [ultraviolet absorber], and 50.7 parts by mass of m-xylene diisocyanate [monomer for an optical material]. This mixed liquid was stirred at 25° C. for 1 hour to complete dissolution. Then, 6.9 parts by mass of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was charged into this mixed liquid, and the mixture was stirred at 25° C. for 5 minutes to make a uniform solution. Furthermore, to the obtained uniform solution, 0.025 parts by mass of 3,5-lutidine [polymerization catalyst] was charged and stirred at 40° C. for 3 hours, whereby the monomers for an optical material were polymerized while adjusting the viscosity to obtain a mixture containing a prepolymer. The viscosity of the mixture containing the prepolymer is shown in Table 2.

Then, degassing was performed on the mixture containing the prepolymer at 400 Pa and 25° C. for 1 hour to obtain a first mixed liquid.

42.4 parts by mass of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was charged, and degassing was performed on this mixture at 400 Pa and 25° C. for 1 hour to obtain a second mixed liquid.

Then, the first mixed liquid and the second mixed liquid were mixed at 20° C. to obtain a polymerizable composition for an optical material.

Whether or not the prepolymer contains an isocyanate group is shown in Table 2. The value (also referred to as "refractive index A−refractive index B") obtained by subtracting refractive index B of the prepolymer raw material composition, which is the composition before the prepolymer is formed and contains two or more different monomers for an optical material and a polymerization catalyst from refractive index A of the polymerizable prepolymer composition for an optical material is shown in Table 2.

The obtained polymerizable composition for an optical material was pumped into a mold for cast molding by the same method as in Example 1B, and the cast molding viscosity was adjusted to the value shown in Table 2.

After heat-insulated polymerization by allowing this cast molded product to stand still for 2 hours in a heat-insulated container at 25° C., the cured molded product was taken out from the heat-insulated container and subjected to further heat polymerization at 120° C. for 1 hour.

A cured molded body was released from the mold, and further annealed at 120° C. for 2 hours to obtain a molded body (lens).

Example 4B to Example 8B

A molded body (lens) was obtained by the same method as in Example 3B, except that the amount of polymerization catalyst in the prepolymerization process, the content of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, and the stirring time were changed to the values shown in Table 2, and the cast molding viscosity of the polymerizable composition for an optical material was adjusted to the value shown in Table 2.

Example 9B

A molded body (lens) was obtained by the same method as in Example 8B, except that the cast molded product was allowed to stand still for 3 hours in a heat-insulated container at 25° C. for heat-insulated polymerization, then the cast molded product was taken out from the heat-insulated container and the mold was released.

Example 10B

A molded body (lens) was obtained by the same method as in Example 8B, except that the cast molded product was heated from 30° C. to 120° C. with time without heat-insulated polymerization, and heat polymerization was carried out over 3 hours.

Comparative Example 1B

A mixed liquid was prepared by stirring 0.1 parts by mass of internal mold release agent for MR manufactured by Mitsui Chemicals, Inc., 1.5 parts by mass of Tinuvin 329 [ultraviolet absorber], and 40.7 parts by mass of m-xylene diisocyanate [monomer for an optical material] at 25° C. for 1 hour to complete dissolution, and then 49.3 parts by mass of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was charged into this mixed liquid, and the mixture was stirred at 25° C. for 5 minutes to make a uniform solution. The solution was degassed at 400 Pa for 1 hour to obtain a first mixed liquid.

10.0 parts by mass of m-xylene diisocyanate [monomer for an optical material] and 0.008 parts by mass of dimethyltin dichloride (DMC) [polymerization catalyst] were stirred at 25° C. for 10 minutes to complete dissolution to obtain a second mixed liquid.

Then, the first mixed liquid and the second mixed liquid were mixed at 20° C. to obtain a polymerizable composition for an optical material.

The obtained polymerizable composition for an optical material was pumped into a mold for cast molding using the same method as in Example 1B, and the cast molding viscosity was adjusted to the value shown in Table 2.

No heat-insulated polymerization was carried out on the cast molded product, and the product was heated from 20° C. to 120° C. with time, and heat polymerization was carried out over 30 hours. Then, a molded body (lens) was obtained by the same method as in Example 1B.

TABLE 2

| | Catalyst | | Prepolymer process | | | | | | |
|---|---|---|---|---|---|---|---|---|---|
| | Type | Total content with respect to total 100 parts by mass of monomer for an optical material (parts by mass) | Catalyst content with respect to total 100 parts by mass of monomer for an optical material (parts by mass) | a1 content (parts by mass) | b1 content (parts by mass) | Stirring time (h) | Whether prepolymer contains isocyanate group or not | refractive index A − refractive index B | Thixotropy ratio |
| Example 1B | 3.5-lutidine | 0.025 | 0.015 | 40.7 | 49.3 | 1 | Yes | 0.012 | 1.0 |
| Example 2B | 3.5-lutidine | 0.025 | 0.0125 | 40.7 | 49.3 | 2 | Yes | 0.013 | 1.0 |
| Example 3B | 3.5-lutidine | 0.025 | 0.025 | 50.7 | 6.9 | 3 | Yes | 0.012 | 1.0 |
| Example 4B | 3.5-lutidine | 0.025 | 0.025 | 50.7 | 7.4 | 3 | Yes | 0.012 | 1.0 |

TABLE 2-continued

| | | | | | | | | | |
|---|---|---|---|---|---|---|---|---|---|
| Example 5B | 3.5-lutidine | 0.025 | 0.025 | 50.7 | 7.4 | 3.5 | Yes | 0.012 | 1.0 |
| Example 6B | 3.5-lutidine | 0.025 | 0.025 | 50.7 | 7.9 | 3 | Yes | 0.013 | 1.0 |
| Example 7B | 3.5-lutidine | 0.025 | 0.025 | 50.7 | 8.1 | 3 | Yes | 0.013 | 1.0 |
| Example 8B | 3.5-lutidine | 0.04 | 0.04 | 50.7 | 8.1 | 1 | Yes | 0.013 | 1.0 |
| Example 9B | 3.5-lutidine | 0.04 | 0.04 | 50.7 | 8.1 | 1 | Yes | 0.013 | 1.0 |
| Example 10B | 3.5-lutidine | 0.04 | 0.04 | 50.7 | 8.1 | 1 | Yes | 0.013 | 1.0 |
| Comparative Example 1B | DMC | 0.008 | — | — | — | — | — | — | — |

| | Viscosity of mixture containing prepolymer (mPa · S) | Cast molding viscosity (mPa · S) | Polymerization time (h) | | | Amine content in cured product (% by mass) | Striae | | |
|---|---|---|---|---|---|---|---|---|---|
| | | | Heat-insulated | Heating | Total | | 4C 2 mm thick | 4C 10 mm thick | Front: 6C Back: 2C 15.6 mm thick |
| Example 1B | 147 | 127 | 2 | 1 | 3 | 0.004 | A | B | C |
| Example 2B | 215 | 200 | 2 | 1 | 3 | 0.004 | A | A | A |
| Example 3B | 41 | 108 | 2 | 1 | 3 | 0.004 | A | C | C |
| Example 4B | 60 | 138 | 2 | 1 | 3 | 0.004 | A | B | B |
| Example 5B | 60 | 150 | 2 | 1 | 3 | 0.004 | A | A | B |
| Example 6B | 83 | 190 | 2 | 1 | 3 | 0.004 | A | A | A |
| Example 7B | 98 | 240 | 2 | I | 3 | 0.004 | A | A | A |
| Example 8B | 102 | 250 | 2 | 1 | 3 | 0.008 | A | A | A |
| Example 9B | 102 | 250 | 3 | 0 | 3 | 0.008 | A | A | A |
| Example 10B | 102 | 250 | 0 | 3 | 3 | 0.008 | A | A | A |
| Comparative Example 1B | — | 21 | 0 | 30 | 30 | — | A | A | C |

The monomer species listed in each Table are as follows.

a1: m-xylylene diisocyanate b1: a mixture of 5,7-dimercaptomethyl-1,11-dimercapto-3,6,9-trithiaundecane, 4,7-dimercaptomethyl-1,11-dimercapto-3,6,9-trithiaundecane, and 4, 8-dimercaptomethyl-1,11-di mercapto-3,6,9-trithiaundecane b2: 4-mercaptomethyl-1,8-dimercapto-3,6-dithiaoctane As shown in Table 2, Examples using a method of producing an optical material that includes:

- a preparation process of preparing a total of 100 parts by mass of two or more different monomers for an optical material and from 0.010 parts by mass to 0.50 parts by mass of a polymerization catalyst;
- a prepolymerization process of obtaining, by obtaining a prepolymer by mixing a portion of the two or more different monomers for an optical material and at least a portion of the polymerization catalyst and polymerizing at least a portion in a portion of the two or more different monomers for an optical material, a mixture containing the prepolymer, wherein at least one of the two or more different monomers for an optical material is an isocyanate compound containing an aromatic ring;
- a process of producing a polymerizable composition for an optical material in which, by further adding at least the balance of the two or more different monomers for an optical material to the mixture containing the prepolymer, a polymerizable composition for an optical material containing the two or more different monomers for an optical material, the prepolymer, and the polymerization catalyst is obtained; and
- a curing process in which, by curing the two or more different monomers for an optical material in the polymerizable composition for an optical material, an optical material that is a cured product of the polymerizable composition for an optical material is obtained, were able to suppress striae in an optical material to be obtained and reduce the production time of the optical material.

On the other hand, in Comparative Example 1B, in which the content of the polymerization catalyst was less than 0.010 parts by mass, the production time of an optical material was as long as 30 hours, and the production time could not be shortened. In Comparative Example 1B, when an optical material with a thickness of 15.6 mm (front: 6 curves, back: 2 curves) was produced, the evaluation of striae was inferior.

Among Examples, in Example 1B, Example 2B, and Examples 4B to 10B, in which the viscosity (or cast molding viscosity) of the polymerizable composition for an optical material when cast molded was 120 mPa·s or higher, striae could be suppressed more favorably.

Example 11B

A mixed liquid was prepared by charging 0.05 parts by mass of JP-506H (manufactured by Johoku Chemical Co., Ltd.) which is an acid phosphate ester, 1.5 parts by mass of Tinuvin 329 [ultraviolet absorber], and 52 parts by mass of m-xylene diisocyanate [monomer for an optical material]. This mixed liquid was stirred at 25° C. for 1 hour to complete dissolution. Then, 7.7 parts by mass of a mixture of 4-mercaptomethyl-1,8-dimercapto-3,6-dithiaoctane [monomer for an optical material] was charged into this mixed liquid, and the mixture was stirred at 25° C. for 5 minutes to make a uniform solution. Furthermore, to the obtained uniform solution, 0.02 parts by mass of 3,5-lutidine [polymerization catalyst] was charged and stirred at 40° C. for 3 hours, whereby the monomers for an optical material were polymerized while adjusting the viscosity to obtain a mixture containing a prepolymer. The viscosity of the mixture containing the prepolymer is shown in Table 3.

Then, degassing was performed on the mixture containing the prepolymer at 400 Pa and 25° C. for 1 hour to obtain a first mixed liquid.

40.3 parts by mass of 4-mercaptomethyl-1,8-dimercapto-3,6-dithiaoctane in the prepolymerization process was charged, and degassing was performed on this mixture at 400 Pa and 25° C. for 1 hour to obtain a second mixed liquid.

Then, the first mixed liquid and the second mixed liquid were mixed at 20° C. to obtain a polymerizable composition for an optical material.

The obtained polymerizable composition for an optical material was pumped into a mold for cast molding by the same method as in Example 1B, and the cast molding viscosity was adjusted to the value shown in Table 3.

After heat-insulated polymerization by allowing this cast molded product to stand still for 2 hours in a heat-insulated container at 25° C., the cured molded product was taken out from the heat-insulated container and subjected to further heat polymerization at 120° C. for 1 hour.

A cured molded body was released from the mold, and further annealed at 120° C. for 2 hours to obtain a molded body (lens).

Example 12B to Example 14B

A molded body (lens) was obtained by the same method as in Example 11B, except that the content of 4-mercaptomethyl-1,8-dimercapto-3,6-dithiaoctane in the prepolymerization process was changed to the value shown in Table 3, and the cast molding viscosity of the polymerizable composition for an optical material was adjusted to the value shown in Table 3.

Example 15B

A molded body (lens) was obtained by the same method as in Example 14B, except that the cast molded product was allowed to stand still for 3 hours in a heat-insulated container at 25° C. for heat-insulated polymerization, then the cast molded product was taken out from the heat-insulated container and the mold was released.

Example 16B

A molded body (lens) was obtained by the same method as in Example 14B, except that the cast molded product was heated from 30° C. to 120° C. with time without heat-insulated polymerization, and heat polymerization was carried out over 3 hours.

Example 17B

A molded body (lens) was obtained by the same method as in Example 14B, except that the catalyst was changed from 3,5-lutidine to dibutyltin dichloride (DBC), and the catalyst content, stirring time in the prepolymerization process, and polymerization time were changed to the values shown in Table 3.

TABLE 3

| | Catalyst | | Prepolymerization process | | | | | | |
|---|---|---|---|---|---|---|---|---|---|
| | Type | Total content with respect to total 100 parts by mass of monomer for an optical material (parts by mass) | Catalyst content with respect to total 100 parts by mass of monomer for an optical material (parts by mass) | a1 content (parts by mass) | b1 content (parts by mass) | Stirring time (h) | Whether prepolymer contains isocyanate group or not | refractive index A − refractive index B | Thixotropy ratio |
| Example 11B | 3,5-lutidine | 0.02 | 0.02 | 52.0 | 7.7 | 3 | Yes | 0.019 | 1.0 |
| Example 12B | 3,5-lutidine | 0.02 | 0.02 | 52.0 | 10.6 | 3 | Yes | 0.024 | 1.0 |
| Example 13B | 3,5-lutidine | 0.02 | 0.02 | 52.0 | 12.0 | 3 | Yes | 0.027 | 1.0 |
| Example 14B | 3,5-lutidine | 0.02 | 0.02 | 52.0 | 13.0 | 3 | Yes | 0.028 | 1.1 |
| Example 15B | 3,5-lutidine | 0.02 | 0.02 | 52.0 | 13.0 | 3 | Yes | 0.028 | 1.1 |
| Example 16B | 3,5-lutidine | 0.02 | 0.02 | 52.0 | 13.0 | 3 | Yes | 0.028 | 1.1 |
| Example 17B | DBC | 0.03 | 0.03 | 52.0 | 13.0 | 1.5 | Yes | 0.028 | 1.1 |

| | Viscosity of mixture containing prepolymer (mPa · S) | Cast molding viscosity (mPa · S) | Polymerization time (h) | | | Amine content in cured product (% by mass) | Striae | | |
|---|---|---|---|---|---|---|---|---|---|
| | | | Heat-insulated | Heating | Total | | 4C 2 mm thick | 4C 10 mm thick | Front: 6C Back: 2C 15.6 mm thick |
| Example 11B | 49 | 66 | 2 | 1 | 3 | 0.011 | A | C | C |
| Example 12B | 200 | 110 | 2 | 1 | 3 | 0.011 | A | B | B |
| Example 13B | 407 | 211 | 2 | 1 | 3 | 0.011 | A | A | B |
| Example 14B | 639 | 275 | 2 | 1 | 3 | 0.011 | A | A | A |
| Example 15B | 639 | 275 | 3 | 0 | 3 | 0.011 | A | A | A |
| Example 16B | 639 | 275 | 0 | 3 | 3 | 0.011 | A | A | A |
| Example 17B | 639 | 275 | 2 | 2 | 4 | — | A | A | A |

As shown in Table 3, Examples using a method of producing an optical material that includes:

a preparation process of preparing a total of 100 parts by mass of two or more different monomers for an optical material and from 0.010 parts by mass to 0.50 parts by mass of a polymerization catalyst;

a prepolymerization process of obtaining, by obtaining a prepolymer by mixing a portion of the two or more different monomers for an optical material and at least a portion of the polymerization catalyst and polymerizing at least a portion in a portion of the two or more different monomers for an optical material, a mixture containing the prepolymer, wherein at least one of the two or more different monomers for an optical material is an isocyanate compound containing an aromatic ring;

a process of producing a polymerizable composition for an optical material in which, by further adding at least the balance of the two or more different monomers for an optical material to the mixture containing the prepolymer, a polymerizable composition for an optical material containing the two or more different monomers for an optical material, the prepolymer, and the polymerization catalyst is obtained; and a curing process in which, by curing the two or more different monomers for an optical material in the polymerizable composition for an optical material, an optical material that is a cured product of the polymerizable composition for an optical material is obtained, were able to suppress striae in an optical material to be obtained and reduce the production time of the optical material.

On the other hand, in Comparative Example 2B, the production time of an optical material was as long as 38 hours, and the production time could not be shortened.

Among Examples, in Examples 13B to 17B, in which the viscosity (or cast molding viscosity) of the polymerizable composition for an optical material when cast molded was 200 mPa·s or higher, striae could be suppressed more favorably.

The disclosures of Japanese Patent Application No. 2020-011128 filed on Jan. 27, 2020 and Japanese Patent Application No. 2020-194660 filed on Nov. 24, 2020 are incorporated herein by reference in their entirety.

All publications, patent applications, and technical standards mentioned in this specification are incorporated herein by reference to the same extent as if each individual publication, patent application, or technical standard was specifically and individually indicated to be incorporated by reference.

The invention claimed is:

1. A cured product of two or more different optical monomers for an optical material, wherein:

at least one of the two or more different monomers for an optical material is an isocyanate compound containing an aromatic ring, there are no striae of a length of 1.0 mm or more within a radius of 15 mm from a center of the cured product, the cured product includes amine that is derived from an amine polymerization catalyst, and the amine content, as measured by gas chromatography mass spectrometry, is from 0.001% by mass to 0.50% by mass.

2. The cured product according to claim 1, wherein the two or more different monomers for an optical material contain at least one active hydrogen compound selected from the group consisting of a polythiol compound containing two or more mercapto groups, a hydroxythiol compound containing one or more mercapto groups and one or more hydroxyl groups, a polyol compound containing two or more hydroxyl groups, and an amine compound.

3. A cured product of two or more different optical monomers for an optical material, wherein:

at least one of the two or more different monomers for an optical material is an isocyanate compound containing an aromatic ring, there are no striae of a length of 1.0 mm or more within a radius of 15 mm from a center of the cured product, the cured product includes an amine that is a polymerization catalyst, the amine content, as measured by gas chromatography mass spectrometry, is from 0.001% by mass to 0.50% by mass, the cured product is obtained by polymerizing the two or more different optical monomers in the presence of the amine, and the amine satisfies the following Condition 1:

[Condition 1]

$-Ea/R$ is from −7,100 to −2,900 wherein Ea is an activation energy calculated by an Arrhenius plot from reaction rate constants of the two or more different monomers for an optical material at two or more different temperatures, and R is the gas constant 8.314 J/mol/K.

4. A cured product of two or more different optical monomers for an optical material, wherein:

at least one of the two or more different monomers for an optical material is an isocyanate compound containing an aromatic ring, there are no striae of a length of 1.0 mm or more within a radius of 15 mm from a center of the cured product, the cured product includes an amine that has a pKa value of from 4 to 8, and the amine content, as measured by gas chromatography mass spectrometry, is from 0.001% by mass to 0.50% by mass.

5. The cured product according to claim 1, wherein the amine contains at least one selected from the group consisting of 3,5-lutidine, 2,4,6-collidine, triethylenediamine, N,N-dimethylethanolamine, and N-ethylmorpholine.

6. The cured product according to claim 3, wherein the amine contains at least one selected from the group consisting of 3,5-lutidine, 2,4,6-collidine, triethylenediamine, N,N-dimethylethanolamine, and N-ethylmorpholine.

7. The cured product according to claim 4, wherein the amine contains at least one selected from the group consisting of 3,5-lutidine, 2,4,6-collidine, triethylenediamine, N,N-dimethylethanolamine, and N-ethylmorpholine.

* * * * *